US012652703B2

(12) United States Patent
Abdelghaffar et al.

(10) Patent No.: US 12,652,703 B2
(45) Date of Patent: Jun. 9, 2026

(54) SELECTING RANDOM ACCESS CHANNEL OCCASIONS FOR SUBBAND FULL-DUPLEX

(71) Applicant: QUALCOMM Incorporated, San Diego, CA (US)

(72) Inventors: Muhammad Sayed Khairy Abdelghaffar, San Jose, CA (US); Ahmed Attia Abotabl, San Diego, CA (US); Abdelrahman Mohamed Ahmed Mohamed Ibrahim, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 312 days.

(21) Appl. No.: 18/440,565

(22) Filed: Feb. 13, 2024

(65) Prior Publication Data

US 2025/0261236 A1    Aug. 14, 2025

(51) Int. Cl.
*H04W 74/0833* (2024.01)
*H04L 5/00* (2006.01)
*H04L 5/14* (2006.01)

(52) U.S. Cl.
CPC ....... *H04W 74/0833* (2013.01); *H04L 5/0048* (2013.01); *H04L 5/14* (2013.01)

(58) Field of Classification Search
CPC .......... H04W 74/0833; H04W 74/0836; H04L 5/0048; H04L 5/14
See application file for complete search history.

(56) References Cited

U.S. PATENT DOCUMENTS

| | | | |
|---|---|---|---|
| 2025/0247888 A1 * | 7/2025 | Zhang | H04W 74/006 |
| 2025/0267667 A1 * | 8/2025 | Shim | H04L 5/00 |

FOREIGN PATENT DOCUMENTS

| | | | | |
|---|---|---|---|---|
| WO | WO-2024035329 A1 * | 2/2024 | ........ | H04W 74/0833 |
| WO | WO-2025212459 A1 * | 10/2025 | ............... | H04L 5/14 |

* cited by examiner

*Primary Examiner* — Marcos L Torres
(74) *Attorney, Agent, or Firm* — Holland & Hart LLP

(57) ABSTRACT

Methods, systems, and devices for wireless communications are described. The described techniques may allow for a network entity to indicate to a user equipment (UE) to use a subband full-duplex (SBFD) random access channel (RACH) configuration or a time division duplex (TDD) PRACH configuration. For example, a control message (e.g., a downlink control information (DCI) or radio resource control (RRC) message) may include a bitfield that indicates which PRACH configuration for the UE to use. Additionally, or alternatively, the UE may select a PRACH configuration based on a capability of the UE to perform the SBFD PRACH configuration, or based on a PRACH configuration indicating RACH occasions that are earliest in time. Additionally, or alternatively, the PDCCH order message may indicate for the UE to transmit the first message multiple times via one or both of the SBFD PRACH configuration or the TDD PRACH configuration.

20 Claims, 18 Drawing Sheets

Control
Signaling 215

PDCCH Order
Message 220

205

210

105-a

RACH
Message 255

115-a 225     230-a     230-b     235

Downlink Resources 240

Uplink Resources 245

RACH Occasions 250

Downlink Resources 310

Uplink Resources 315

RACH Occasions 320

130

105

115

Network
Entity

Transceiver

1210

Antenna

1215

Communications
Manager

1220

Memory

Code

1230

1225

1240

Processor

1235

1205

1200

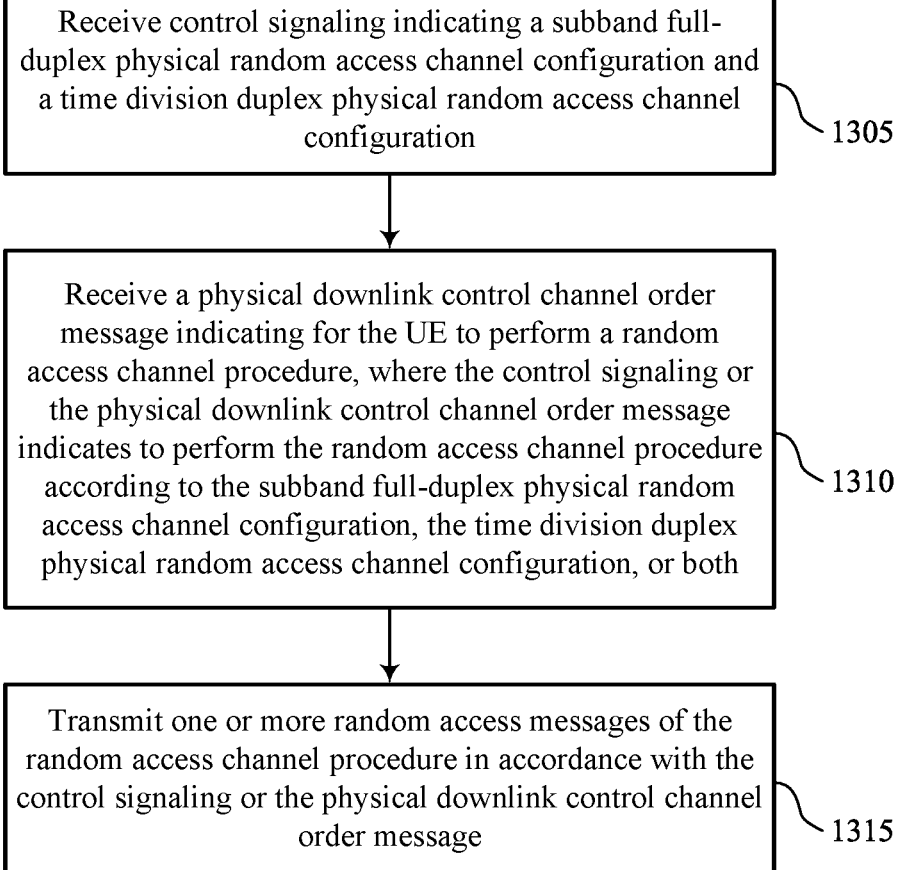

Receive control signaling indicating a subband full-duplex physical random access channel configuration and a time division duplex physical random access channel configuration

1305

Receive a physical downlink control channel order message indicating for the UE to perform a random access channel procedure, where the control signaling or the physical downlink control channel order message indicates to perform the random access channel procedure according to the subband full-duplex physical random access channel configuration, the time division duplex physical random access channel configuration, or both

1310

Transmit one or more random access messages of the random access channel procedure in accordance with the control signaling or the physical downlink control channel order message

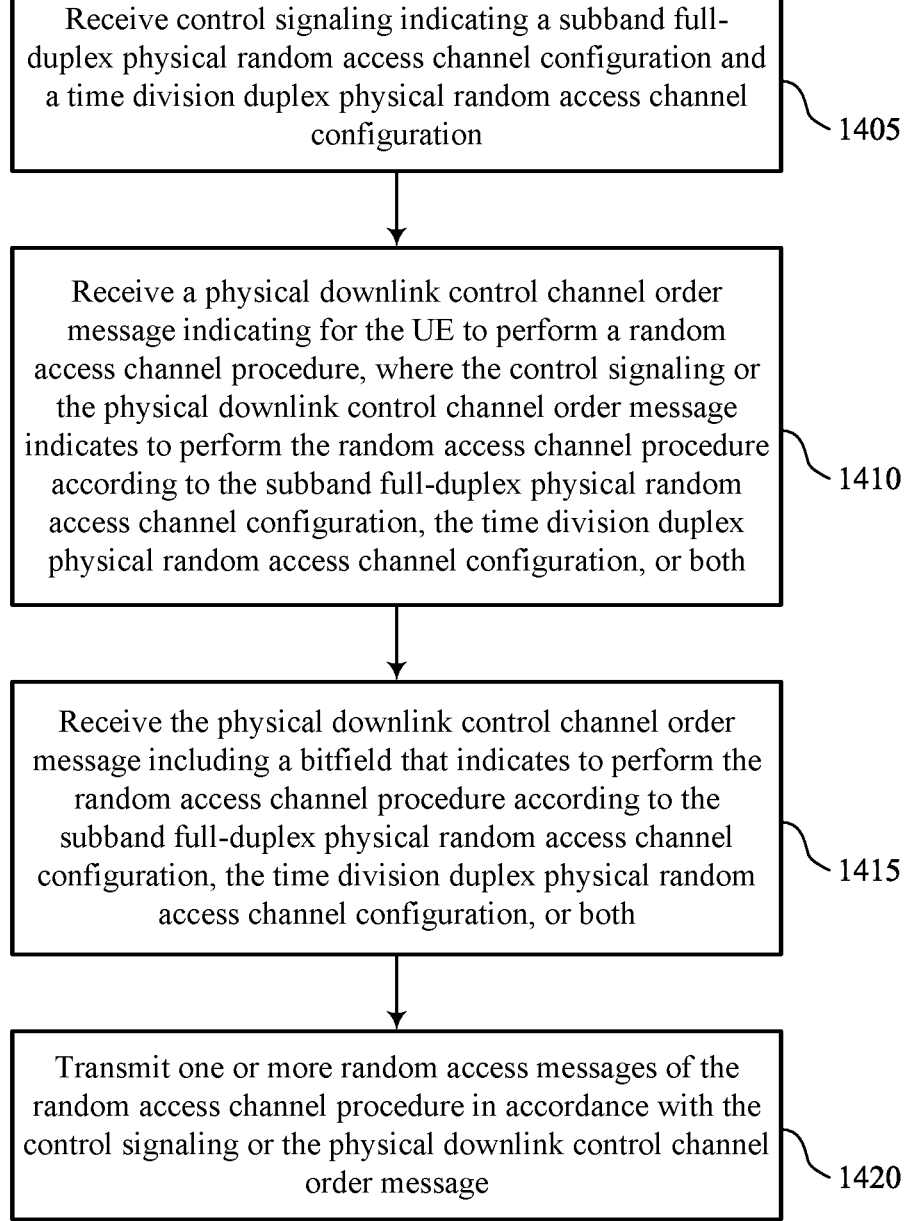

Receive control signaling indicating a subband full-duplex physical random access channel configuration and a time division duplex physical random access channel configuration

1405

Receive a physical downlink control channel order message indicating for the UE to perform a random access channel procedure, where the control signaling or the physical downlink control channel order message indicates to perform the random access channel procedure according to the subband full-duplex physical random access channel configuration, the time division duplex physical random access channel configuration, or both

1410

Receive the physical downlink control channel order message including a bitfield that indicates to perform the random access channel procedure according to the subband full-duplex physical random access channel configuration, the time division duplex physical random access channel configuration, or both

1415

Transmit one or more random access messages of the random access channel procedure in accordance with the control signaling or the physical downlink control channel order message

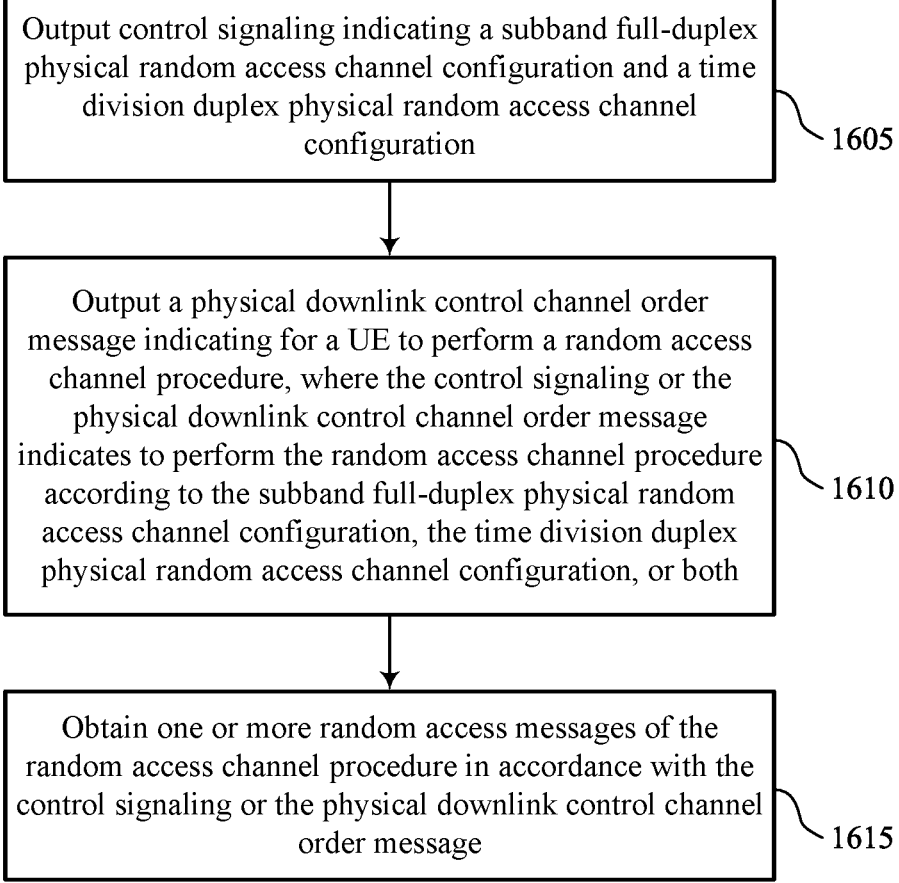

Output control signaling indicating a subband full-duplex physical random access channel configuration and a time division duplex physical random access channel configuration     1605

Output a physical downlink control channel order message indicating for a UE to perform a random access channel procedure, where the control signaling or the physical downlink control channel order message indicates to perform the random access channel procedure according to the subband full-duplex physical random access channel configuration, the time division duplex physical random access channel configuration, or both     1610

Obtain one or more random access messages of the random access channel procedure in accordance with the control signaling or the physical downlink control channel order message     1615

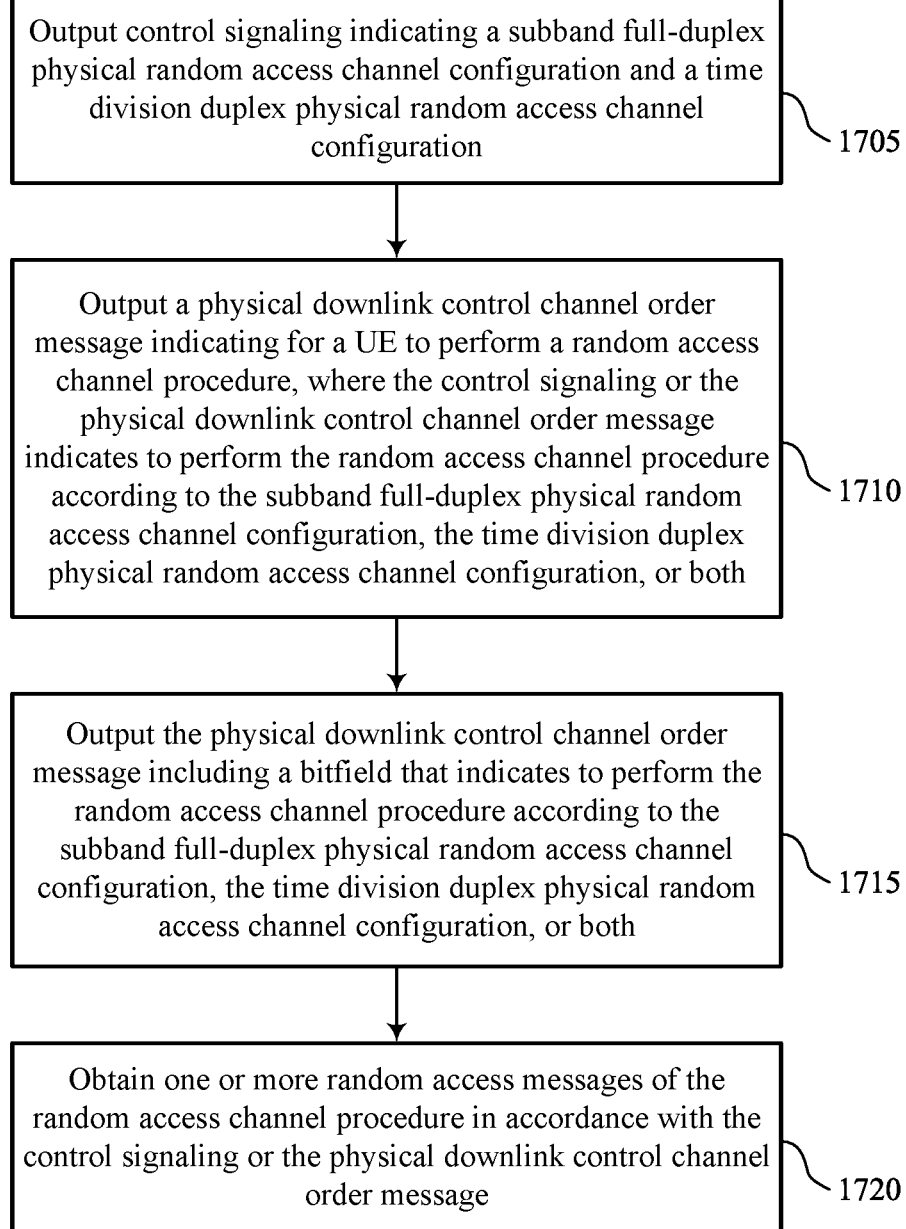

Output control signaling indicating a subband full-duplex physical random access channel configuration and a time division duplex physical random access channel configuration

1705

Output a physical downlink control channel order message indicating for a UE to perform a random access channel procedure, where the control signaling or the physical downlink control channel order message indicates to perform the random access channel procedure according to the subband full-duplex physical random access channel configuration, the time division duplex physical random access channel configuration, or both

1710

Output the physical downlink control channel order message including a bitfield that indicates to perform the random access channel procedure according to the subband full-duplex physical random access channel configuration, the time division duplex physical random access channel configuration, or both

1715

Obtain one or more random access messages of the random access channel procedure in accordance with the control signaling or the physical downlink control channel order message

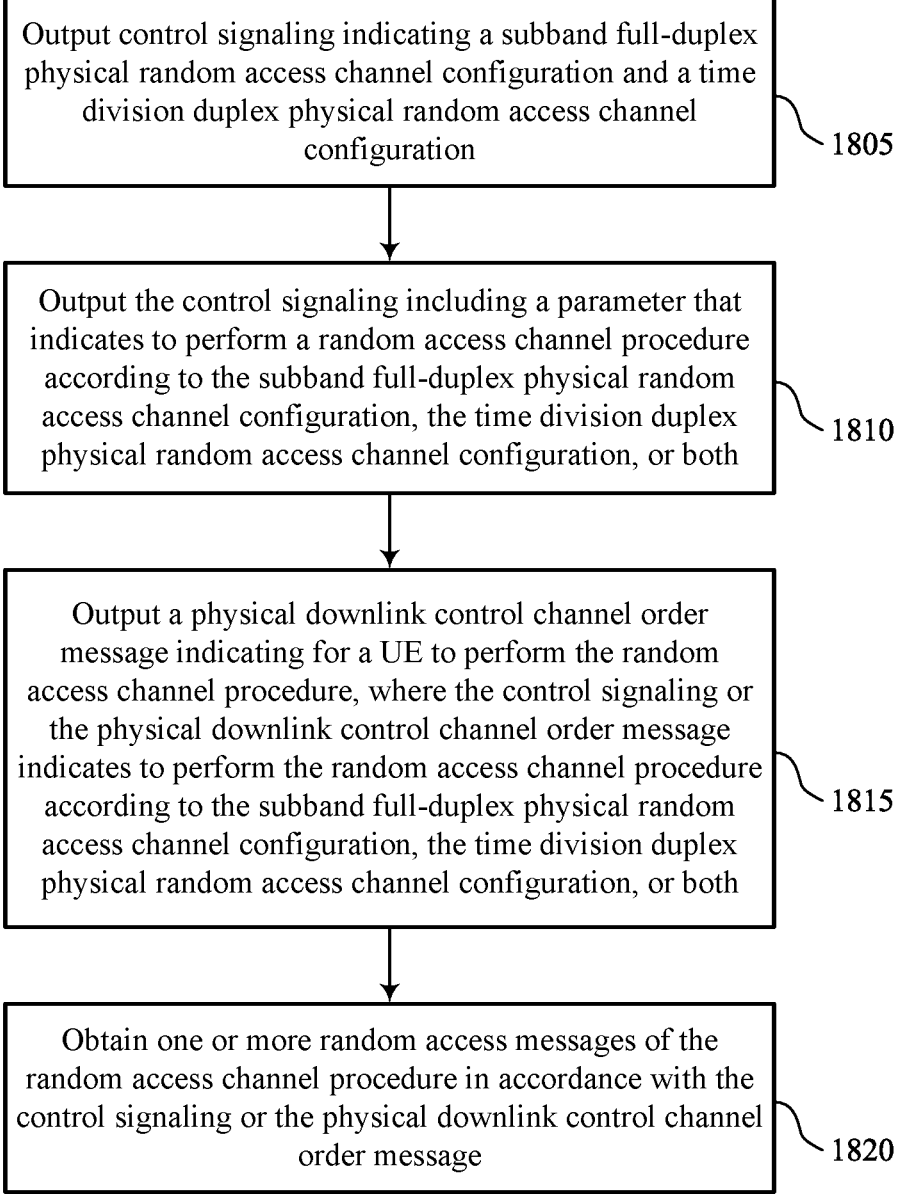

Output control signaling indicating a subband full-duplex physical random access channel configuration and a time division duplex physical random access channel configuration

1805

Output the control signaling including a parameter that indicates to perform a random access channel procedure according to the subband full-duplex physical random access channel configuration, the time division duplex physical random access channel configuration, or both

1810

Output a physical downlink control channel order message indicating for a UE to perform the random access channel procedure, where the control signaling or the physical downlink control channel order message indicates to perform the random access channel procedure according to the subband full-duplex physical random access channel configuration, the time division duplex physical random access channel configuration, or both

1815

Obtain one or more random access messages of the random access channel procedure in accordance with the control signaling or the physical downlink control channel order message

SELECTING RANDOM ACCESS CHANNEL
OCCASIONS FOR SUBBAND FULL-DUPLEX

FIELD OF TECHNOLOGY

The following relates to wireless communications, including selecting random access channel (RACH) occasions for subband full-duplex (SBFD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support selecting random access channel occasions for subband full-duplex. For example, the described techniques may enable a network entity to indicate to a user equipment (UE) to use a subband full-duplex (SBFD) physical random access channel (PRACH) configuration or a time division duplex (TDD) PRACH configuration (e.g., or both). For example, a physical downlink control channel (PDCCH) order message requesting for the UE to perform a RACH procedure may include a bitfield that indicates which PRACH configuration for the UE to use. In some examples, the UE may receive a radio resource control (RRC) message indicating when the bitfield is present in the PDCCH order message. Additionally, or alternatively, the UE may receive an RRC message indicating for the UE to use either the SBFD PRACH configuration or the TDD PRACH configuration. Additionally, or alternatively, the UE may select a PRACH configuration based on a capability of the UE to perform the SBFD PRACH configuration, or based on a PRACH configuration indicating RACH occasions that are earliest in time. Additionally, or alternatively, the PDCCH order message may indicate for the UE to transmit the first message multiple times via one or both of the SBFD PRACH configuration or the TDD PRACH configuration.

A method for wireless communications by a UE is described. The method may include receiving control signaling indicating a SBFD PRACH configuration and a TDD PRACH configuration, receiving a PDCCH order message indicating for the UE to perform a RACH procedure, where the control signaling or the PDCCH order message indicates to perform the RACH procedure according to the SBFD PRACH configuration, the TDD PRACH configuration, or both, and transmitting one or more random access messages of the RACH procedure in accordance with the control signaling or the PDCCH order message.

A UE for wireless communications is described. The UE may include one or more memories storing processor executable code, and one or more processors coupled with the one or more memories. The one or more processors may individually or collectively be operable to execute the code to cause the UE to receive control signaling indicating a SBFD PRACH configuration and a TDD PRACH configuration, receive a PDCCH order message indicating for the UE to perform a RACH procedure, where the control signaling or the PDCCH order message indicates to perform the RACH procedure according to the SBFD PRACH configuration, the TDD PRACH configuration, or both, and transmit one or more random access messages of the RACH procedure in accordance with the control signaling or the PDCCH order message.

Another UE for wireless communications is described. The UE may include means for receiving control signaling indicating a SBFD PRACH configuration and a TDD PRACH configuration, means for receiving a PDCCH order message indicating for the UE to perform a RACH procedure, where the control signaling or the PDCCH order message indicates to perform the RACH procedure according to the SBFD PRACH configuration, the TDD PRACH configuration, or both, and means for transmitting one or more random access messages of the RACH procedure in accordance with the control signaling or the PDCCH order message.

A non-transitory computer-readable medium storing code for wireless communications is described. The code may include instructions executable by one or more processors to receive control signaling indicating a SBFD PRACH configuration and a TDD PRACH configuration, receive a PDCCH order message indicating for the UE to perform a RACH procedure, where the control signaling or the PDCCH order message indicates to perform the RACH procedure according to the SBFD PRACH configuration, the TDD PRACH configuration, or both, and transmit one or more random access messages of the RACH procedure in accordance with the control signaling or the PDCCH order message.

In some examples of the method, user equipment (UEs), and non-transitory computer-readable medium described herein, receiving the PDCCH order message may include operations, features, means, or instructions for receiving the PDCCH order message including a bitfield that indicates to perform the RACH procedure according to the SBFD PRACH configuration, the TDD PRACH configuration, or both.

In some examples of the method, user equipment (UEs), and non-transitory computer-readable medium described herein, receiving the control signaling may include operations, features, means, or instructions for receiving the control signaling indicating presence of the bitfield in the PDCCH order message.

In some examples of the method, user equipment (UEs), and non-transitory computer-readable medium described herein, receiving the control signaling may include operations, features, means, or instructions for receiving the control signaling including a parameter that indicates to perform the RACH procedure according to the SBFD PRACH configuration, the TDD PRACH configuration, or both.

Some examples of the method, user equipment (UEs), and non-transitory computer-readable medium described herein may further include operations, features, means, or instructions for transmitting a capability message indicating a SBFD PRACH capability of the UE, where the SBFD PRACH configuration indicates a random access preamble, a random access occasion, or both, based on the SBFD PRACH capability, and where transmitting the one or more random access messages includes and transmitting a first random access message of the one or more random access messages including the random access preamble, via the random access occasion, or both.

In some examples of the method, user equipment (UEs), and non-transitory computer-readable medium described herein, transmitting the one or more random access messages may include operations, features, means, or instructions for transmitting the one or more random access messages via an earlier of the first random access occasion or the second random access occasion.

In some examples of the method, user equipment (UEs), and non-transitory computer-readable medium described herein, the PDCCH order message indicates a first random access occasion in a SBFD symbol period and indicates a second random access occasion in an uplink symbol period and the one or more random access messages may be transmitted via the first random access occasion, the second random access occasion, or both.

Some examples of the method, user equipment (UEs), and non-transitory computer-readable medium described herein may further include operations, features, means, or instructions for transmitting a first random access message of the one or more random access messages via the first random access occasion and transmitting a second random access message of the one or more random access messages via the second random access occasion.

A method for wireless communications by a network entity is described. The method may include outputting control signaling indicating a SBFD PRACH configuration and a TDD PRACH configuration, outputting a PDCCH order message indicating for a UE to perform a RACH procedure, where the control signaling or the PDCCH order message indicates to perform the RACH procedure according to the SBFD PRACH configuration, the TDD PRACH configuration, or both, and obtaining one or more random access messages of the RACH procedure in accordance with the control signaling or the PDCCH order message.

A network entity for wireless communications is described. The network entity may include one or more memories storing processor executable code, and one or more processors coupled with the one or more memories. The one or more processors may individually or collectively be operable to execute the code to cause the network entity to output control signaling indicating a SBFD PRACH configuration and a TDD PRACH configuration, output a PDCCH order message indicating for a UE to perform a RACH procedure, where the control signaling or the PDCCH order message indicates to perform the RACH procedure according to the SBFD PRACH configuration, the TDD PRACH configuration, or both, and obtain one or more random access messages of the RACH procedure in accordance with the control signaling or the PDCCH order message.

Another network entity for wireless communications is described. The network entity may include means for outputting control signaling indicating a SBFD PRACH configuration and a TDD PRACH configuration, means for outputting a PDCCH order message indicating for a UE to perform a RACH procedure, where the control signaling or the PDCCH order message indicates to perform the RACH procedure according to the SBFD PRACH configuration, the TDD PRACH configuration, or both, and means for obtaining one or more random access messages of the RACH procedure in accordance with the control signaling or the PDCCH order message.

A non-transitory computer-readable medium storing code for wireless communications is described. The code may include instructions executable by one or more processors to output control signaling indicating a SBFD PRACH configuration and a TDD PRACH configuration, output a PDCCH order message indicating for a UE to perform a RACH procedure, where the control signaling or the PDCCH order message indicates to perform the RACH procedure according to the SBFD PRACH configuration, the TDD PRACH configuration, or both, and obtain one or more random access messages of the RACH procedure in accordance with the control signaling or the PDCCH order message.

In some examples of the method, network entities, and non-transitory computer-readable medium described herein, outputting the PDCCH order message may include operations, features, means, or instructions for outputting the PDCCH order message including a bitfield that indicates to perform the RACH procedure according to the SBFD PRACH configuration, the TDD PRACH configuration, or both.

In some examples of the method, network entities, and non-transitory computer-readable medium described herein, outputting the control signaling may include operations, features, means, or instructions for outputting the control signaling indicating presence of the bitfield in the PDCCH order message.

In some examples of the method, network entities, and non-transitory computer-readable medium described herein, outputting the control signaling may include operations, features, means, or instructions for outputting the control signaling including a parameter that indicates to perform the RACH procedure according to the SBFD PRACH configuration, the TDD PRACH configuration, or both.

Some examples of the method, network entities, and non-transitory computer-readable medium described herein may further include operations, features, means, or instructions for obtaining a capability message indicating a SBFD PRACH capability of the UE, where the SBFD PRACH configuration indicates a random access preamble, a random access occasion, or both, based on the SBFD PRACH capability, and where obtaining the one or more random access messages includes and obtaining a first random access message of the one or more random access messages including the random access preamble, via the random access occasion, or both.

In some examples of the method, network entities, and non-transitory computer-readable medium described herein, obtaining the one or more random access messages may include operations, features, means, or instructions for obtaining the one or more random access messages via an earlier of the first random access occasion or the second random access occasion.

In some examples of the method, network entities, and non-transitory computer-readable medium described herein, the PDCCH order message indicates a first random access occasion in a SBFD symbol period and indicates a second random access occasion in an uplink symbol period and the one or more random access messages may be transmitted via the first random access occasion, the second random access occasion, or both.

Some examples of the method, network entities, and non-transitory computer-readable medium described herein may further include operations, features, means, or instructions for obtaining a first random access message of the one or more random access messages via the first random access occasion and obtaining a second random access message of the one or more random access messages via the second random access occasion.

BRIEF DESCRIPTION OF THE DRAWINGS

FIG. 3 shows an example of a resource diagram that supports selecting RACH occasions for SBFD in accordance with one or more aspects of the present disclosure.

FIGS. 13 through 18 show flowcharts illustrating methods that support selecting RACH occasions for SBFD in accordance with one or more aspects of the present disclosure.

DETAILED DESCRIPTION

Figure 1:
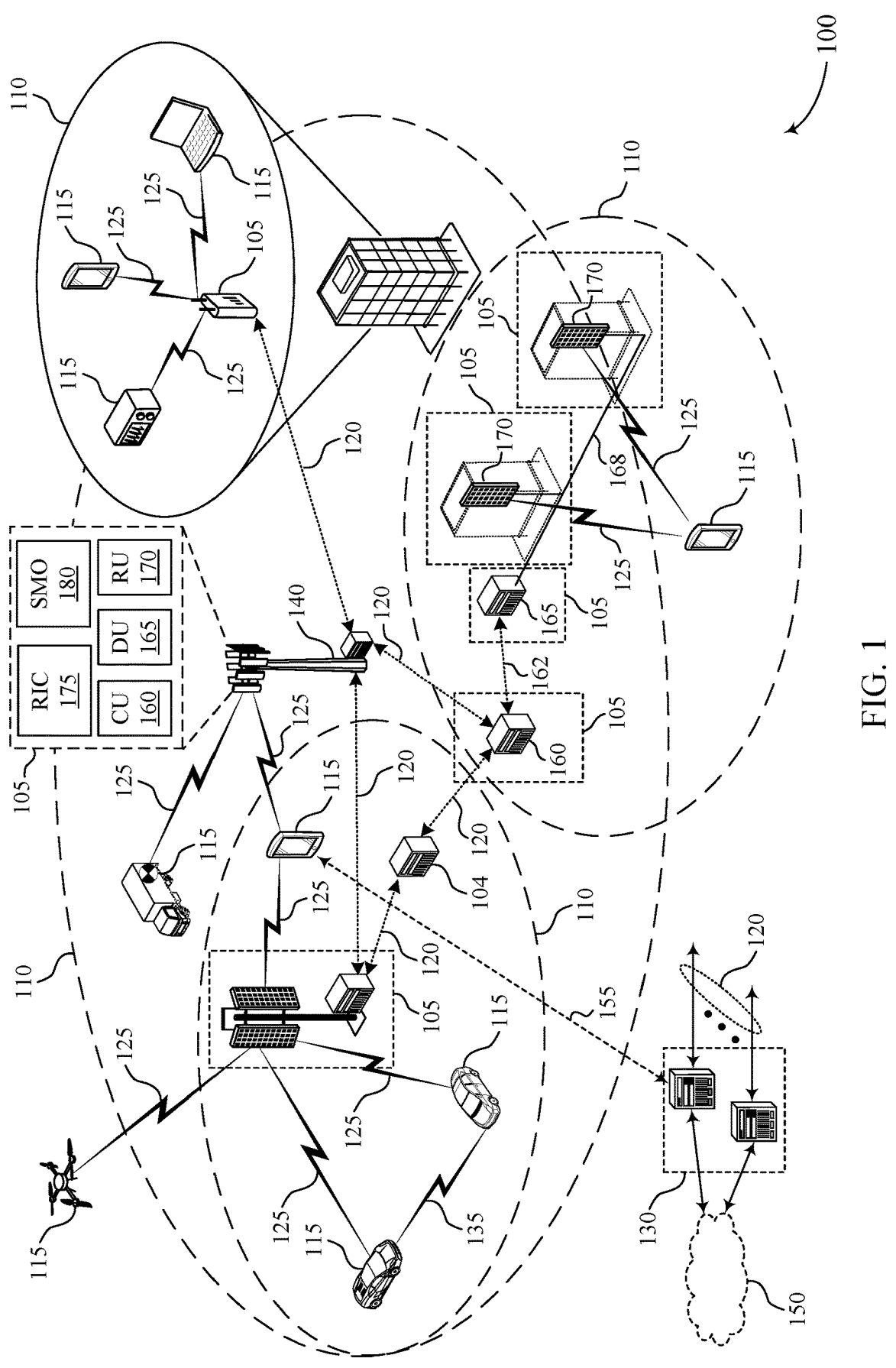
FIG. 1 shows an example of a wireless communications system that supports selecting random access channel (RACH) occasions for subband full-duplex (SBFD) in accordance with one or more aspects of the present disclosure.

In some wireless communication systems, a user equipment (UE) may perform a random access channel (RACH) procedure to establish a connection with a network entity. In some cases, the UE may receive a configuration for a first message of the RACH procedure, including one or more physical RACH (PRACH) occasions in one or more slots via which the UE may transmit the first message. In some examples, the UE may receive multiple PRACH configurations (e.g., from the network entity). For example, the UE may receive a configuration for PRACH occasions in one or more subband full-duplex (SBFD) slots and a configuration for PRACH occasions in one or more time division duplex (TDD) slots. The UE may receive a physical downlink control channel (PDCCH) order message (e.g., such as a downlink control information (DCI) message) requesting for the UE to perform a RACH procedure. However, if the UE is configured with both a SBFD PRACH configuration and a TDD PRACH configuration, the UE may not be aware of which PRACH configuration to use to transmit the first message of the RACH procedure.

Accordingly, techniques described herein may allow for the network entity to indicate to the UE to use the SBFD PRACH configuration or the TDD PRACH configuration (e.g., or both). For example, the PDCCH order message may include a bitfield that indicates which PRACH configuration for the UE to use. The payload of the PDCCH order message may include a one-bit bitfield to indicate to the UE whether to transmit the PRACH message in an uplink slot (e.g., a non-SBFD symbol) or in an uplink subband of SBFD symbol. The PRACH message transmitted in the uplink slot may be transmitted based on the TDD PRACH configuration and the PRACH message transmitted in the SBFD symbol may be transmitted based on the SBFD PRACH configuration.

In some examples, the UE may receive a radio resource control (RRC) message indicating when the bitfield is present in the PDCCH order message. Additionally, or alternatively, the UE may receive an RRC message indicating for the UE to use either the SBFD PRACH configuration or the TDD PRACH configuration. Additionally, or alternatively, the UE may select a PRACH configuration based on a capability of the UE to perform the SBFD PRACH configuration, or based on a PRACH configuration indicating RACH occasions that are earliest (e.g., nearest) in time after the reception of the PDCCH order message. Additionally, or alternatively, the PDCCH order message may indicate for the UE to transmit the first message multiple times. In such examples, the UE may transmit the first message of the RACH procedure according to both of the SBFD PRACH configuration and the TDD PRACH configuration (e.g., to increase a reliability and/or to improve the coverage that the network entity will receive the first message).

Aspects of the disclosure are initially described in the context of wireless communications systems. Aspects of the disclosure are further illustrated by and described with reference to resource diagrams, process flows, apparatus diagrams, system diagrams, and flowcharts that relate to selecting RACH occasions for SBFD.

FIG. 1 shows an example of a wireless communications system 100 that supports selecting RACH occasions for SBFD in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support full-duplex communications, in which a UE 115 or a network entity 105 may perform simultaneous communication of downlink signaling and communication of uplink signaling on a frequency subband basis (e.g., across a set of frequencies). For example, the UE 115 may partition a particular band (e.g., 100 MHz) into sub-bands which the UE 115 may use exclusively for uplink or downlink communications. For example, the UE 115 may use the 40 MHz of a 100 MHz band for downlink communications, 20 MHz for uplink communications, and another 40 MHz again for downlink communications. That is, the uplink and downlink bands may have relatively similar frequencies, however, may be non-overlapping in frequency. Full-duplex communications may be suitable for macro cells with a large transmit power, and may be relatively simpler to enable than other full-duplex techniques. In addition, full-duplex communications may improve latency and increase uplink coverage via frequency division duplexing (FDD) in time division duplexing (TDD) bands.

To further enhance flexibility of some operations, the wireless communications system 100 may support UEs 115 and network entities 105 which may both perform simultaneous transmission and reception of downlink and uplink communications via partially or fully overlapping frequency bands. For example, the wireless communications system 100 may support a UE 115 and a network entity 105 that operate using full-duplex communications via partially overlapping frequency bands, or a network entity 105 that operates using half-duplex communications (e.g., in a multi-transmission reception point (mTRP)) scenario) and a UE 115 that operates using full-duplex communications.

In a TDD scenario, network entities 105 in the wireless communications system 100 may support full-duplex operations (e.g., where a network entity 105 may communicate simultaneously on uplink and downlink sub-bands that are non-overlapping in frequency), while UEs 115 may support half-duplex communications. For example, the network entity 105 may use a particular sub-band for transmitting downlink communications to a first UE 115, and a particular sub-band for receiving simultaneous uplink communications from a second UE 115. As such, a UE 115 capable of half-duplex communications may be paired with any network entity 105 capable of full-duplex operations in the wireless communications system 100.

In some examples, the network entity 105 may use IBFD communications, in which the network entity 105 may transmit and receive communications with a UE 115 via a same time resource and a same frequency resource. That is, the downlink and uplink may share same IBFD time and frequency resources, which may partially or fully overlap. Alternatively, the network entity 105 may use SBFD (e.g., flexible duplex) communications, in which the network entity 105 may transmit and receive communications with the UE 115 via a same time resource but via different frequency resources. That is, a frequency resource used for downlink communications may be separated from a frequency resource used for uplink communications (e.g., by a guard band).

In some examples of the wireless communications system 100, a UE 115 may perform a RACH procedure (e.g., a contention free random access (CFRA) procedure or a contention based random access (CBRA) procedure) to establish a connection with a network entity 105. The UE 115 may receive a PDCCH order message (e.g., with DCI format 1_0 with a cell radio network temporary identifier (C-RNTI)) requesting for the UE 115 to perform a random access procedure. The UE 115 may determine that the PDCCH message is a PDCCH order message if a frequency domain resource allocation (FDRA) field of the PDCCH message is set to all 1's.

The PDCCH order message may indicate a configuration for a first message (e.g., msg1, msgA) of the RACH procedure and information for the UE 115 to determine a RACH occasion for the first message. For example, the configuration may include six bits indicating a preamble index, one bit indicating for the UE 115 to transmit the first message via an uplink or supplementary uplink indicator, six bits indicating a synchronization signal block (SSB) index associated with the RACH occasion, and four bits indicating a physical PRACH (PRACH) mask index associated with the RACH occasion. The PDCCH order message may include a set of reserved bits (e.g., ten or twelve reserved bits).

If the PDCCH order message includes a non-zero preamble index, the PDCCH order message may trigger the UE 115 to perform CFRA. The UE 115 may accordingly transmit the first message based on the indicated configuration in the indicated RACH occasion. If the configuration includes a preamble index of 0, the PDCCH order message may trigger the UE 115 to perform CBRA. The UE 115 may accordingly ignore the remaining PDCCH order message fields and select (e.g., randomly select) a preamble for the first message. The UE 115 may determine a RACH occasion in which to transmit the first message based on a measured SSB. Accordingly, in a CBRA procedure, one or more UEs 115 may select a same RACH occasion and preamble, which may result in a collision at the network entity 105.

In response to transmitting the first message, the UE 115 may monitor for a PDCCH (e.g., a PDCCH with a cyclic redundancy check (CRC) scrambled by a random access RNTI (RA-RNTI) associated with the network entity 105. The PDCCH may schedule a second message of the RACH procedure (e.g., a random access response (RAR) physical downlink shared channel (PDSCH) message, msgB, msg2). In the case of a two-step RACH procedure, the UE 115 may communicate one or more messages with the network entity 105 following reception of the RAR PDSCH. In the case of a four-step RACH procedure, the UE 115 may exchange one or more additional messages (e.g., msg3, msg4) with the network entity 105 as part of the RACH procedure following reception of the RAR PDSCH. In some examples (e.g., for a CFEA on a primary cell (PCell) or a primary special cell (PSCell)), the UE 115 may assume the PDCCH and the RAR PDSCH are quasi co-located (QCLed) with the PDCCH order message.

Techniques described herein may allow for a network entity 105 to indicate to a UE 115 to use a SBFD PRACH configuration, a TDD PRACH configuration, or both. For example, a PDCCH order message requesting for the UE 115 to perform a RACH procedure may include a bitfield that indicates which PRACH configuration and/or which symbol types (e.g., SBFD or non-SBFD symbols) for the UE 115 to use. In some examples, the UE 115 may receive a RRC message indicating when the bitfield is present in the PDCCH order message. Additionally, or alternatively, the UE 115 may receive an RRC message indicating for the UE 115 to use either the SBFD PRACH configuration or the TDD PRACH configuration and/or to transmit a PRACH message via SBFD or non-SBFD symbols. Additionally, or alternatively, the UE 115 may select a PRACH configuration based on a capability of the UE 115 to perform the SBFD PRACH configuration, or based on a PRACH configuration indicating RACH occasions that are earliest in time. Additionally, or alternatively, the PDCCH order message may indicate for the UE 115 to transmit the first message multiple times via one or both of the SBFD PRACH configuration or the TDD PRACH configuration.

Figure 2:
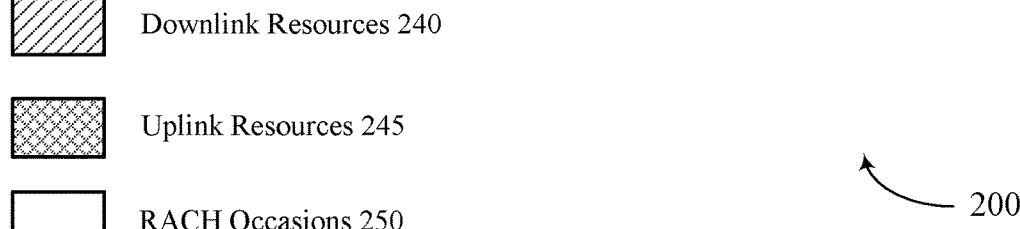
FIG. 2 shows an example of a wireless communications system that supports selecting RACH occasions for SBFD in accordance with one or more aspects of the present disclosure.

FIG. 2 shows an example of a wireless communications system 200 that supports selecting RACH occasions for SBFD in accordance with one or more aspects of the present disclosure. The wireless communications system 200 may implement or may be implemented by aspects of the wireless communications system 100. For example, the wireless communications system 200 may include a UE 115 (e.g., a UE 115-*a*) and a network entity 105 (e.g., a network entity 105-*a*), which may be examples of the corresponding devices as described with reference to FIG. 1.

In some examples of the wireless communications system 200, a UE 115-*a* may perform a RACH procedure to establish a connection with a network entity 105-*a*. In some examples (e.g., if the UE 115-*a* is in an RRC_Connected mode), the UE 115-*a* may receive a control signaling 215

(e.g., one or more RRC messages) from the network entity 105-*a* via a downlink channel 205 indicating one or more configurations and parameters for the UE 115-*a* to communicate with the network entity 105-*a*. In some examples (e.g., if the UE 115-*a* is in an RRC_Inactive or RRC_Idle mode), the UE 115-*a* may not have an active RRC connection with the network entity 105-*a*, and may transition to a connected mode to receive the control signaling 215.

The control signaling 215 may indicate one or more configurations (e.g., slot formats, SBFD uplink or downlink subbands configuration, PRACH configurations) for the UE 115-*a* to use to communicate with the network entity 105-*a*. For example, the control signaling 215 may indicate that one or more slots are downlink slots 225 with downlink resources 240, SBFD slots 230 with both downlink subband resources 240 and uplink subband resources 245, or uplink slots 235 with uplink resources 245. The UE 115-*a* may receive one or more configurations (e.g., a parameter TDD-UL-DL-ConfigCommon) indicating for the UE 115-*a* to use the SBFD slots 230 as uplink slots 235 or downlink slots 225.

The control signaling 215 may, additionally, or alternatively, indicate PRACH configurations for the UE 115-*a* to transmit a RACH message 255 via an uplink channel 210. For example, the control signaling may indicate a PRACH configuration index, a preamble format, a SFN, a subframe number, a starting symbol, a quantity of PRACH slots with a subframe, a quantity of random access occasions (e.g., RACH occasions, PRACH occasions) per PRACH slot, and a PRACH duration of each RACH occasion. Such PRACH configurations are illustrated in further detail with reference to FIG. 3.

In some examples, the network entity 105-*a* may configure the UE 115-*a* with multiple PRACH configurations. For example, if the UE 115-*a* is an SBFD-aware UE 115, the network entity 105-*a* may configure a first PRACH configuration (e.g., a TDD PRACH configuration) for RACH occasions 250 in an uplink slot 235 and a second PRACH configuration (e.g., an SBFD PRACH configuration) for RACH occasions 250 in a SBFD slot 230-*a* (e.g., a SBFD slot configured in downlink slot by TDD-UL-DL-ConfigCommon). Accordingly, the UE 115-*a* may perform a RACH procedure via the SBFD slot 230-*a*, which may reduce a random access latency, reduce the PRACH collision probability, and/or improve the coverage of the first RACH message 255 and one or more other messages of the RACH procedure (e.g., msg3) by configuring relatively more (e.g., more frequent) slots for the UE 115-*a* to transmit RACH message 255.

For example, the UE 115-*a* may utilize uplink subbands (e.g., uplink subband resources 245) in the SBFD slot 230-*a* and a consecutive SBFD slot 230-*b* to enable repetition (e.g., msg1 and msg3 repetition) and frequency hopping. Such techniques may improve uplink coverage for initial access as compared to TDD PRACH configurations. For example, the UE 115-*a* may transmit the RACH message 255 (e.g., msg1) via the SBFD slot 230-*a*, and may receive a RAR and transmit a third RACH message (e.g., msg3) via the SBFD slot 230-*b* (e.g., without waiting for the next uplink slot 235). Accordingly, the SBFD PRACH configuration may reduce random access latency (e.g., and latency associated with initial access and handover when L1/L2 mobility is enabled).

The SBFD PRACH configuration may improve a RACH capacity of the network entity 105-*a* by enabling additional RACH occasions 250 within the uplink resources 245 of the SBFD slot 230-*a*. The additional RACH occasions 250 may accordingly reduce a probability of collisions in CBRA, which may enable more UEs 115 to access the network entity 105.

The UE 115-a may receive a PDCCH order message 220 (e.g., a DCI format 1_0 with C-RNTI) via the downlink channel 205 (e.g., during the downlink slot 225 or via downlink subband resources in the SBFD slot 230-a or the SBFD slot 230-b) indicating one or more parameters for the UE 115-a to perform the RACH procedure (e.g., a random access preamble index, uplink or supplementary uplink indication, an SSB index, a PRACH mask index). The UE 115-a may use the one or more parameters indicated via the PDCCH order message to select a RACH occasion and transmit the RACH message 255 (e.g., for either CBRA or CFRA). However, if the UE 115-a is configured with both of the SBFD-dedicated PRACH configuration and the TDD PRACH configuration, the UE 115-a may not be aware of whether to interpret the bit fields of the PDCCH order message 220 (e.g., to select resources such as RACH occasions and PRACH preambles) according to the SBFD PRACH configuration or the TDD PRACH configuration.

Accordingly, the network entity 105-a may indicate (e.g., implicitly or explicitly indicate) to the UE 115-a whether to use the SBFD PRACH configuration (e.g., in the SBFD slot 230-a or the SBFD slot 230-b) or the TDD PRACH configuration (e.g., in non-SBFD slots such as the uplink slot 235) when transmitting the RACH message 255. In some examples, the network entity 105-a may provide a dynamic indication of which PRACH configuration for the UE 115-a to use. For example, the network entity 105-a may transmit a bitfield in a payload of the PDCCH order message 220 (e.g., with DCI format 1_0) indicating whether the UE 115-a should utilize the SBFD-dedicated PRACH configuration or the TDD PRACH configuration for transmitting the RACH message in SBFD symbols or non-SBFD (e.g., TDD) symbols.

In some examples, the network entity 105-a may indicate whether the bitfield is present in the PDCCH order message 220 via an RRC parameter in the control signaling 215. If the bitfield is not present in the PDCCH order message 220, the UE 115-a may interpret one or more bitfields of the PDCCH order message 220 according to the SBFD-dedicated PRACH configuration (e.g., or according to the TDD PRACH configuration, as indicated by a preconfigured rule). The UE 115-a may accordingly transmit the RACH message 255 for CFRA (e.g., when the PDCCH order message 220 indicates a specific PRACH preamble) or for CBRA (e.g., when the PDCCH order message 220 does not indicate a specific PRACH preamble).

In some examples, the network entity 105-a may provide a semi-static indication of which PRACH configuration for the UE 115-a to use. For example, the network entity 105-a may transmit a parameter (e.g., DuplexRACHType) indicating whether the UE 115-a is to utilize the SBFD-dedicated PRACH configuration or the TDD PRACH configuration. The UE 115-a may accordingly interpret the fields of the PDCCH order message according to the indicated PRACH configuration to select one or more PRACH preambles and one or more RACH occasions (e.g., via the PRACH mask index parameter and random access preamble index parameter in the PDCCH order message 220) to transmit the RACH message 255.

In some examples, the PDCCH order message 220 or the control signaling 215 may implicitly indicate which PRACH configuration for the UE 115-a to use based on one or more rules. For example, the UE 115-a may be configured (e.g., preconfigured) to interpret the fields of the PDCCH order message 220 (e.g., select RACH occasions 250 and preambles for the RACH message 255) according to the SBFD PRACH configuration if the UE 115-a is an SBFD aware UE 115-a. The UE 115-a may be configured (e.g., preconfigured) to interpret the fields of the PDCCH order message 220 (e.g., select one or more RACH occasions 250 and preambles for the RACH message 255) according to the TDD PRACH configuration if the UE 115-a is not an SBFD aware UE 115-a (e.g., select one or more RACH occasions and one or mores preamble based on PRACH-ConfigCommon indicated in the control signaling 215).

In some examples, the UE 115-a may select either the SBFD PRACH configuration or the TDD PRACH configuration to reduce latency. For example, the UE 115-a may determine to use the PRACH configuration that indicates RACH occasions 250 that are nearest in time. Accordingly, the control signaling 215 may implicitly indicate which PRACH configuration for the UE 115-a to use (e.g., based on a chronological order of configured RACH occasions 250 associated with the PRACH configurations).

In some examples, to improve a reliability that the network entity 105-a will receive the RACH message 255, the PDCCH order message 220 may trigger the UE 115-a to transmit repetitions of the RACH message 255 (e.g., up to two transmissions of the RACH message 255). In such examples, the PDCCH order message 220 may indicate for the UE 115-a to use multiple RACH occasions 250 to transmit the RACH message 255 (e.g., a PDCCH order may trigger PRACH transmission and indicate RACH occasions in both SBFD symbols and non-SBFD symbols). The multiple RACH occasions 250 may be RACH occasions 250 associated with the SBFD PRACH configuration, the TDD PRACH configuration, or both. That is, a bitfield in the PDCCH order message 220 may indicate for the UE 115-a to use the SBFD PRACH configuration, the TDD PRACH configuration, or both.

To enable repetition of the RACH message 255, the PDCCH order message 220 may include duplicates of some fields. For example, the PDCCH order message 220 may indicate multiple (e.g., two) preamble indices and multiple (e.g., two) RACH occasions 250 (e.g., PRACH mask index fields). In such examples, if the bitfield indicates for the UE 115-a to use both of the SBFD PRACH configuration and the TDD PRACH configuration, a first preamble index and a first RACH occasion 250 indicated by the PDCCH order message 220 in a first field may apply to a first PRACH configuration (e.g., the TDD PRACH configuration), and a second preamble index and RACH occasion 250 indicated by the PDCCH order message 220 in a second field may apply to a second PRACH configuration (e.g., the SBFD PRACH configuration). The UE 115-a may transmit a first RACH message that includes the first preamble index during a first RACH occasion in accordance with one of the PRACH configurations (e.g., the TDD PRACH configuration) and a second RACH message that includes the second preamble index during a second RACH occasion in accordance with the other of the PRACH configurations (e.g., the SBFD PRACH configuration).

In some examples, to reduce DCI overhead, the PDCCH order message 220 may indicate for the UE 115-a to use a same preamble index for a first transmission of the RACH message 255 (e.g., in an uplink symbol in accordance with the TDD PRACH configuration) and for a retransmission for the RACH message 255 (e.g., in an SBFD symbol in accordance with the SBFD PRACH configuration). Thus, the PDCCH order message 220 may indicate to use a preamble index in the RACH message 255 (e.g., in an uplink symbol in accordance with the TDD PRACH configuration) and as well as in one or more repetitions of the RACH message 255 (e.g., in an SBFD symbol in accordance with the SBFD PRACH configuration). Additionally, or alternatively, the UE 115-a may receive, via the PDCCH order message 220, an indication of a first preamble index of a first preamble, and may apply a preamble offset to the first preamble (e.g., or a preamble index offset to the first preamble index) to determine a second preamble. The preamble offset or the preamble index offset may be indicated via the control signaling 215 (e.g., RRC configuration). The UE 115-a may transmit the first preamble in the first RACH message and may transmit the second preamble in the second RACH message.

although the subframe 305-f is illustrated as being a last subframe 305, one or more subframes 305 may follow the subframe 305-f.

If the UE 115 is an SBFD-aware UE, the network entity 105 may configure the UE 115 with multiple PRACH configurations. For example, the network entity may transmit control signaling (e.g., one or more RRC messages) indicating a SBFD PRACH configuration for RACH occasions 320 in the uplink resources 315 within SBFD slots (e.g., with a PRACH configuration index of 104) and a TDD PRACH configuration for RACH occasions 320 in the uplink resources 315 within TDD uplink slots (e.g., with a PRACH configuration index of 95), as illustrated below with reference to Table 1.

TABLE 1

| PRACH Config. Index | Preamble Format | $n_{SFN}$ mode x = $\frac{\quad}{y}$ | | Subframe Number | Starting Symbol | # PRACH Slots | # RACH Occasions | PRACH Duration |
|---|---|---|---|---|---|---|---|---|
| | | x | y | | | | | |
| 95 | A2 | 1 | 0 | 305-a, 305-f | 7 | 1 | 3 | 4 |
| 104 | A2 | 1 | 0 | 305-a, 305-f | 0 | 1 | 3 | 4 |

In some examples, the UE 115-a may transmit a first transmission of the RACH message 255 as part of CFRA, and a retransmission of the RACH message 255 as CBRA. In such examples, the PDCCH order message 220 may indicate to use a same preamble index for transmission of the RACH message 255 and for one or more retransmissions of the RACH message 255. In some examples, the PDCCH order message 220 may indicate to use a first preamble index for CFRA and a second preamble index for CBRA, wherein the first preamble index differs from the second preamble index. As such, the UE 115-a may transmit a first RACH message 255 that includes a first preamble index as part of CFRA, and a second RACH message 255 that includes a second preamble index as CBRA.

Figure 3:
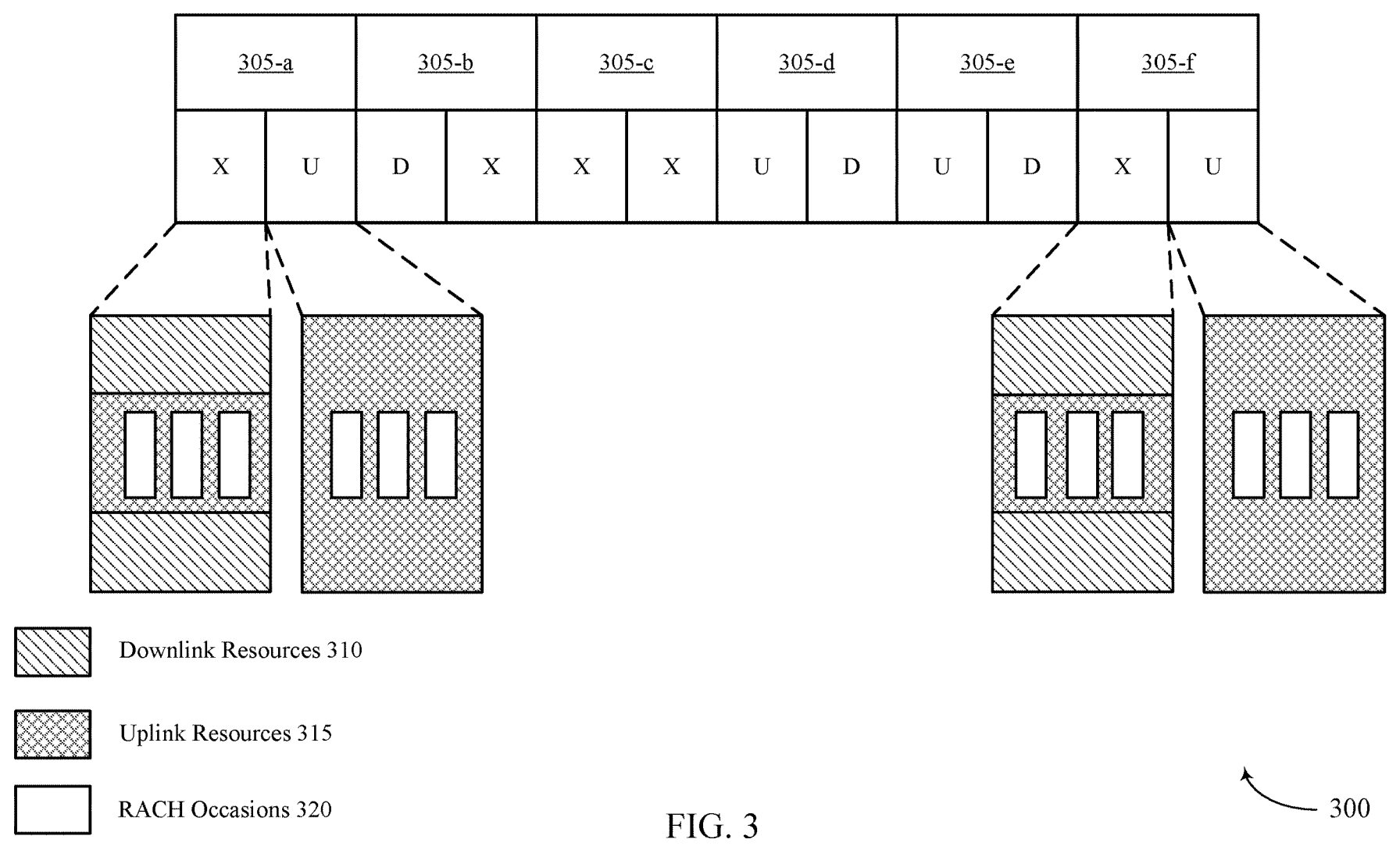

FIG. 3 shows an example of a resource diagram 300 that supports selecting RACH occasions for SBFD in accordance with one or more aspects of the present disclosure. The resource diagram 300 may implement or may be implemented by aspects of the wireless communications system 100 or the wireless communications system 200. For example, the resource diagram 300 may be implemented by a UE 115 and a network entity 105, which may be examples of the corresponding devices as described with reference to FIG. 1.

As illustrated with reference to FIG. 3, in some examples, a network entity 105 may configure (e.g., via control signaling 215) a UE 115 with one or more slots in a SBFD slot pattern (e.g., a DXXXU slot pattern or one or more other slot patterns). As described herein, a D slot may refer to a TDD downlink slot with downlink resources 310, a U slot may refer to a TDD uplink slot with uplink resources 315, and an X slot may refer to an SBFD slot with both downlink resources 310 and uplink resources 315. Each slot may be in a subframe 305 (e.g., a subframe 305-a through a subframe 305-f, with two slots per subframe, as illustrated with reference to FIG. 3). Although the subframe 305-a is illustrated with reference to FIG. 3 as being a first subframe, in some examples, one or more subframes 305 (e.g., four subframes 305) may precede the subframe 305-a. Similarly, If the UE 115 is not an SBFD-aware UE 115, the network entity 105 may indicate a single PRACH configuration (e.g., the TDD PRACH configuration) for the UE 115. The PRACH configurations illustrated by Table 1 provide illustrative examples of PRACH configuration indexes, preamble formats, frame number configurations, subframe numbers, starting symbols, PRACH slot quantities, RACH occasion quantities, and PRACH durations associated with each PRACH configuration. Such PRACH configurations are not limiting examples, and each PRACH configuration may be associated with one or more other values for the parameters provided in Table 1.

In some examples, when the SBFD-aware UE 115 receives a PDCCH order message initiating a RACH procedure, the UE 115 may determine which PRACH configuration to use to transmit one or more RACH messages (e.g., msg1, msgA) in SBFD slots or in non-SBFD slots. That is, the UE 115 may determine whether to transmit the one or more RACH messages via the RACH occasions 320 in the SBFD slots, via the RACH occasions 320 in the TDD uplink slots, or both. For example, the network entity 105 may indicate to the UE 115 whether to use the SBFD PRACH configuration (e.g., and therefore to transmit via the RACH occasions 320 in the SBFD slots) or whether to use the TDD PRACH configuration (e.g., and therefore to transmit via the RACH occasions in the TDD uplink slots).

In some examples, as described with reference to FIG. 2, the network entity 105 may indicate the PRACH configuration explicitly via the PDCCH order message or via the control signaling (e.g., RRC messaging). In some examples, the network entity 105 may indicate the PRACH configuration implicitly via UE capability or via a chronological order of the configured RACH occasions 320. In some examples, the UE 115 may transmit a first RACH message via a first RACH occasion 320 (e.g., in an SBFD slot according to the SBFD PRACH configuration or in a TDD uplink slot according to the TDD PRACH configuration) and a retransmission of the first RACH message via a second RACH occasion 320 (e.g., in an SBFD slot according to the SBFD PRACH configuration or in a TDD uplink slot according to the TDD PRACH configuration).

Figure 4:
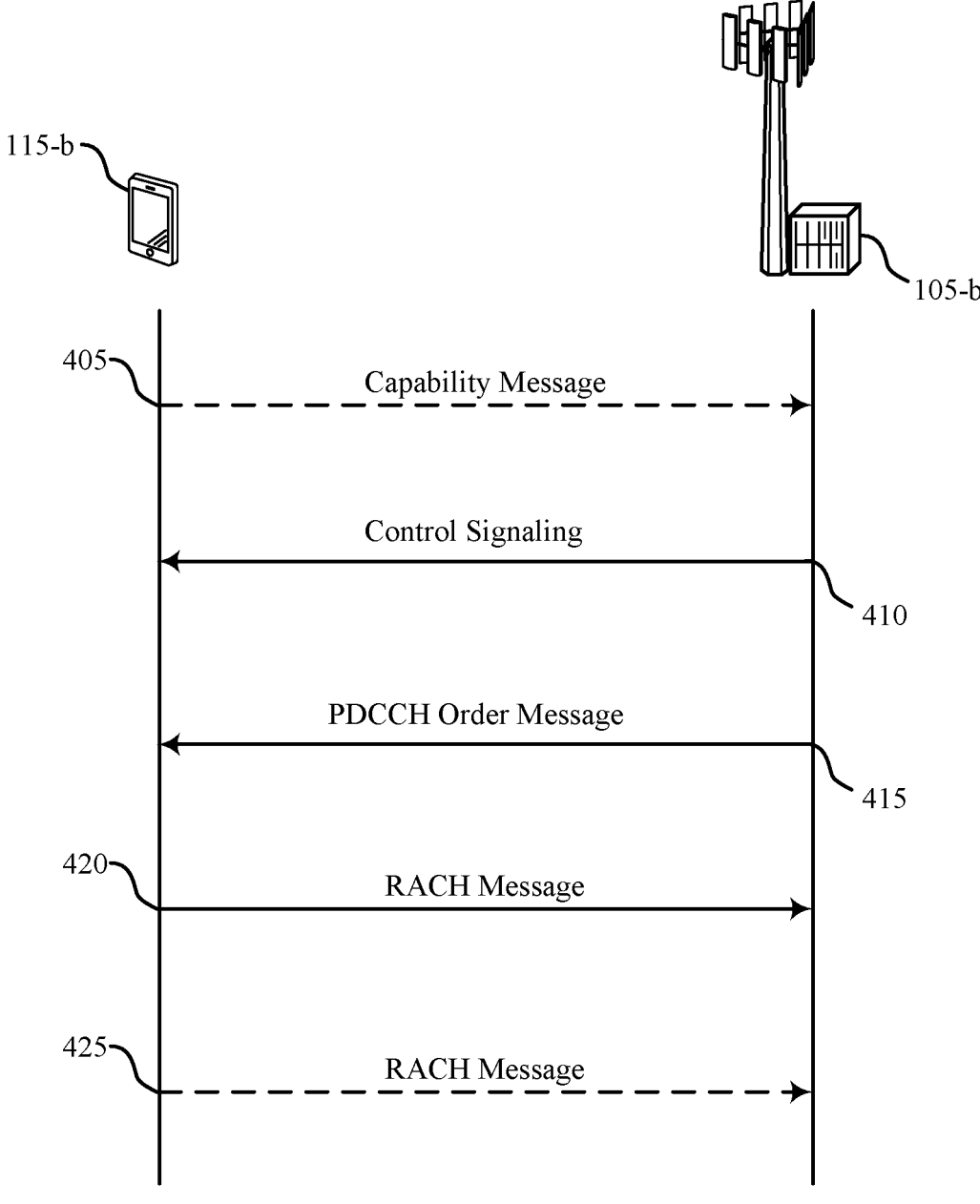
FIG. 4 shows an example of a process flow that supports selecting RACH occasions for SBFD in accordance with one or more aspects of the present disclosure.

FIG. 4 shows an example of a process flow 400 that supports selecting RACH occasions for SBFD in accordance with one or more aspects of the present disclosure. The process flow 400 may implement or may be implemented by aspects of the wireless communications system 100, the wireless communications system 200, or the resource diagram 300. For example, the process flow 400 may include a UE 115 (e.g., a UE 115-b) and a network entities 105 (e.g., a network entity 105-b), which may be examples of the corresponding devices as described with reference to FIG. 1.

In the following description of the process flow 400, the operations between the UE 115-b and the network entity 105-b may be transmitted in a different order than the example order shown. Some operations may also be omitted from the process flow 400, and other operations may be added to the process flow 400. Further, although some operations or signaling may be shown to occur at different times for discussion purposes, these operations may actually occur at the same time.

In some examples, at 405, the UE 115-b may transmit a capability message to the network entity 105-b. The capability message may indicate a SBFD capability of the UE 115-b. For example, the SBFD capability may be a capability of the UE 115-b to communicate (e.g., transmit RACH messages) via one or more SBFD slots.

At 410, the UE 115-b may receive control signaling (e.g., RRC signaling) from the network entity 105-b via a downlink channel indicating a SBFD PRACH configuration and a TDD PRACH configuration. For example, the SBFD PRACH configuration may indicate one or more RACH occasions in SBFD slots and the RDD PRACH configuration may indicate one or more RACH occasions in TDD slots. In some examples, each PRACH configuration may, additionally, or alternatively, indicate one or more PRACH preambles (e.g., a preamble format or index) for a first message of a RACH procedure.

In some examples, the control signaling may include a parameter (e.g., a DuplexRACHType parameter) to indicate for the UE 115-b to perform the RACH procedure using the SBFD PRACH configuration, the TDD PRACH configuration, or both. In some examples, the control signaling may include an indication of whether a PDCCH order message includes a bitfield to indicate for the UE 115-b to perform the RACH procedure using the SBFD PRACH configuration, the TDD PRACH configuration, or both. In some examples, the control signaling may include an indication for the UE 115-b to transmit a first RACH message of the RACH procedure via one or more RACH occasions (e.g., and one or more preambles) determined according to the SBFD PRACH configuration or the TDD PRACH configuration, and to transmit a retransmission of the first RACH message according to the SBFD PRACH configuration or the TDD PRACH configuration. The control signaling may indicate for the UE 115-b to perform the RACH procedure in accordance with the capability. For example, if the UE 115-b is capable of performing the RACH procedure according to the SBFD PRACH configuration, the network entity 105-b may indicate for the UE 115-b to perform the RACH procedure according to the SBFD PRACH configuration.

At 415, the UE 115-b may receive the PDCCH order message from the network entity 105-b via a downlink channel requesting for the UE 115-b to perform the RACH procedure (e.g., to transmit one or more RACH messages). The PDCCH order message may include one or more fields indicating RACH preamble indexes and RACH occasions (e.g., a PRACH mask index) for the UE 115-b to perform a CFRA procedure, or an indication for the UE 115-b to perform a CBRA procedure (e.g., via a preamble index of 0). In some examples, the PDCCH order message may include a bitfield to indicate for the UE 115-b to perform the RACH procedure using the SBFD PRACH configuration, the TDD PRACH configuration, or both. For example, the PDCCH order message may include the bitfield if the control signaling indicates that the PDCCH order message includes the bitfield.

In some examples, the PDCCH order message may include an indication for the UE 115-b to transmit a first RACH message of the RACH procedure via RACH occasions (e.g., and preambles) determined according to the SBFD PRACH configuration or the TDD PRACH configuration, and to transmit a retransmission of the first RACH message via RACH occasions (e.g., and preambles) determined according to the SBFD PRACH configuration or the TDD PRACH configuration. In some examples, the PDCCH order message may indicate a first set of parameters (e.g., a first preamble index, a first PRACH mask index) for the UE 115-b to transmit the first RACH message and a second set of parameters (e.g., a second preamble index, a second PRACH mask index) for the UE 115-b to transmit the retransmission of the first RACH message. In some examples, the PDCCH order message may indicate the first set of parameters and an offset from the first set of parameters for the UE 115-a to transmit the retransmission of the first RACH message. In some examples, the control signaling may indicate the offset.

The control signaling may indicate for the UE 115-b to perform the RACH procedure in accordance with the capability. For example, if the UE 115-b is capable of performing the RACH procedure according to the SBFD PRACH configuration, the network entity 105-b may indicate for the UE 115-b to perform the RACH procedure according to the SBFD PRACH configuration.

In some examples, the control signaling or the PDCCH order message may indicate for the UE 115-b to perform the RACH procedure using the SBFD PRACH configuration, the TDD PRACH configuration, or both implicitly. For example, the UE 115-b may select a PRACH configuration based on an earlier one of a first RACH occasion associated with the SBFD PRACH configuration or a second RACH occasion associated with the TDD PRACH configuration.

At 420, the UE 115-b may transmit one or more RACH messages to the network entity 105-b in accordance with the control signaling and the PDCCH order message. For example, the UE 115-b may transmit a first RACH message of the RACH procedure using RACH occasions and/or preambles selected according to the SBFD PRACH configuration and/or the TDD PRACH configuration. In some examples, the UE 115-b may transmit the one or more RACH messages via an earlier one of the first RACH occasion associated with the SBFD PRACH configuration or the second RACH occasion associated with the TDD PRACH configuration.

In some examples, at 425, the UE 115-b may transmit one or more additional RACH messages to the network entity 105-b in accordance with the control signaling and the PDCCH order message. For example, the UE 115-b may transmit a retransmission of the first RACH message of the RACH procedure using RACH occasions and/or preambles selected according to the SBFD PRACH configuration and/or the TDD PRACH configuration. In some examples, the UE 115-b may transmit the first message according to a first RACH occasion indicated by the PDCCH order message, and may transmit the transmission of the first RACH message via a second RACH occasion indicated by the PDCCH order message.

Figure 5:
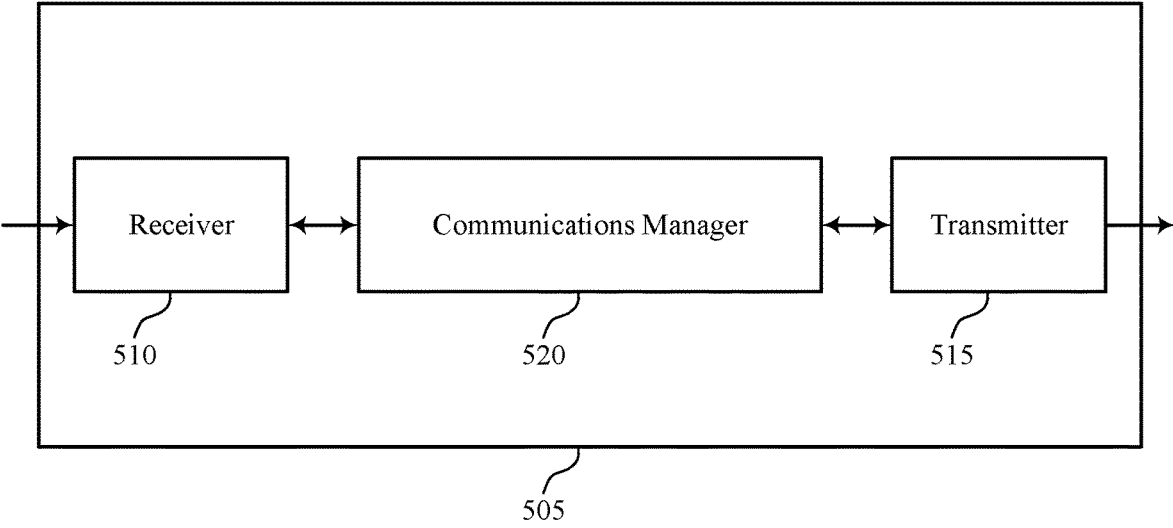
FIGS. 5 and 6 show block diagrams of devices that support selecting RACH occasions for SBFD in accordance with one or more aspects of the present disclosure.

FIG. 5 shows a block diagram 500 of a device 505 that supports selecting RACH occasions for SBFD in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to selecting RACH occasions for SBFD). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to selecting RACH occasions for SBFD). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of selecting RACH occasions for SBFD as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving control signaling indicating a SBFD PRACH configuration and a TDD PRACH configuration. The communications manager 520 is capable of, configured to, or operable to support a means for receiving a PDCCH order message indicating for the UE to perform a RACH procedure, where the control signaling or the PDCCH order message indicates to perform the RACH procedure according to the SBFD PRACH configuration, the TDD PRACH configuration, or both. The communications manager 520 is capable of, configured to, or operable to support a means for transmitting one or more random access messages of the RACH procedure in accordance with the control signaling and the PDCCH order message.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for selecting a PRACH configuration for SBFD-aware UEs, which may enable more efficient utilization of communication resources.

Figure 6:
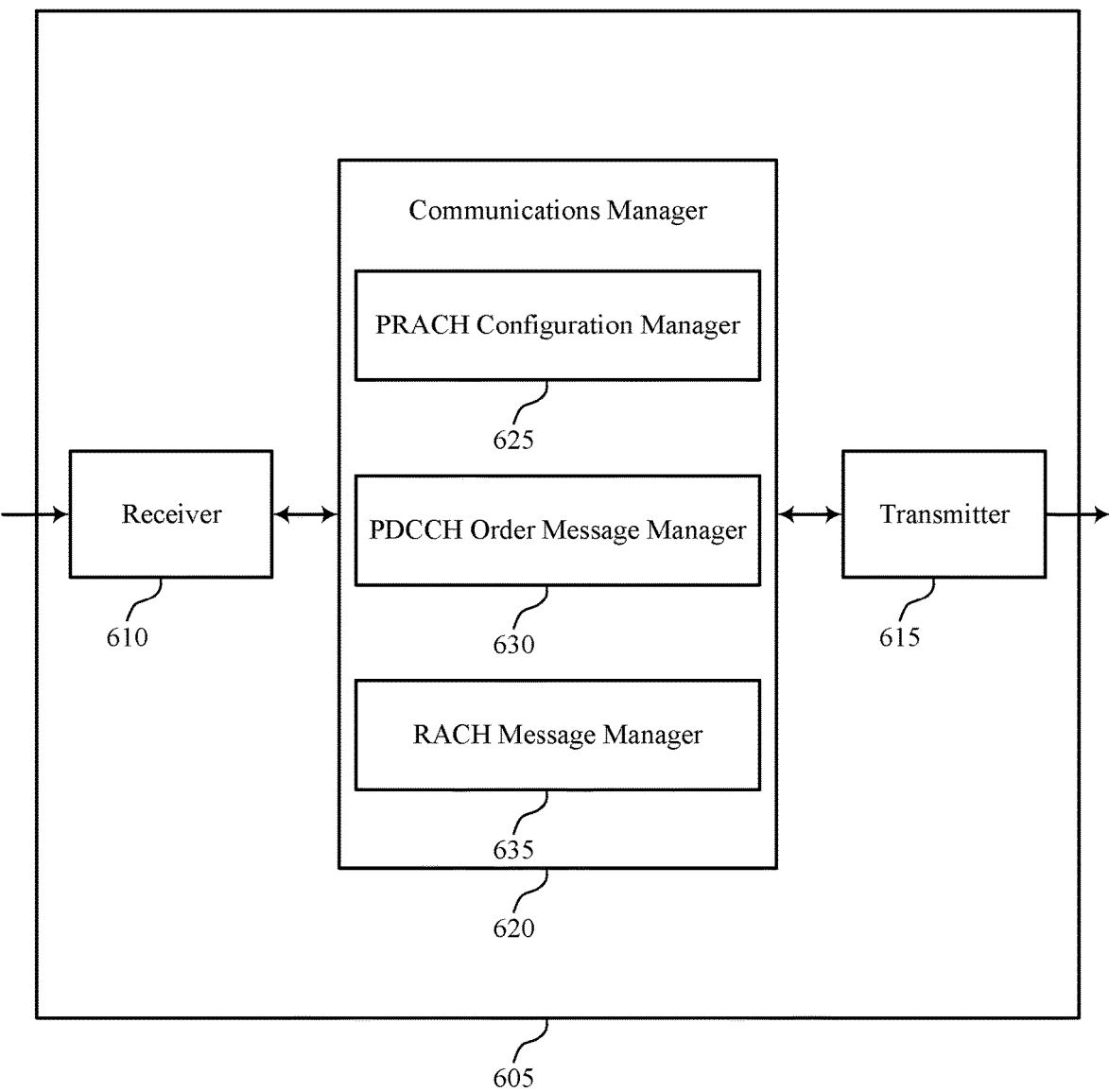

FIG. 6 shows a block diagram 600 of a device 605 that supports selecting RACH occasions for SBFD in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to selecting RACH occasions for SBFD). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to selecting RACH occasions for SBFD). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of selecting RACH occasions for SBFD as described herein. For example, the communications manager 620 may include a PRACH configuration manager 625, a PDCCH order message manager 630, a RACH message manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The PRACH configuration manager 625 is capable of, configured to, or operable to support a means for receiving control signaling indicating a SBFD PRACH configuration and a TDD PRACH configuration. The PDCCH order message manager 630 is capable of, configured to, or operable to support a means for receiving a PDCCH order message indicating for the UE to perform a RACH procedure, where the control signaling or the PDCCH order message indicates to perform the RACH procedure according to the SBFD PRACH configuration, the TDD PRACH configuration, or both. The RACH message manager 635 is capable of, configured to, or operable to support a means for transmitting one or more random access messages of the RACH procedure in accordance with the control signaling and the PDCCH order message.

Figure 7:
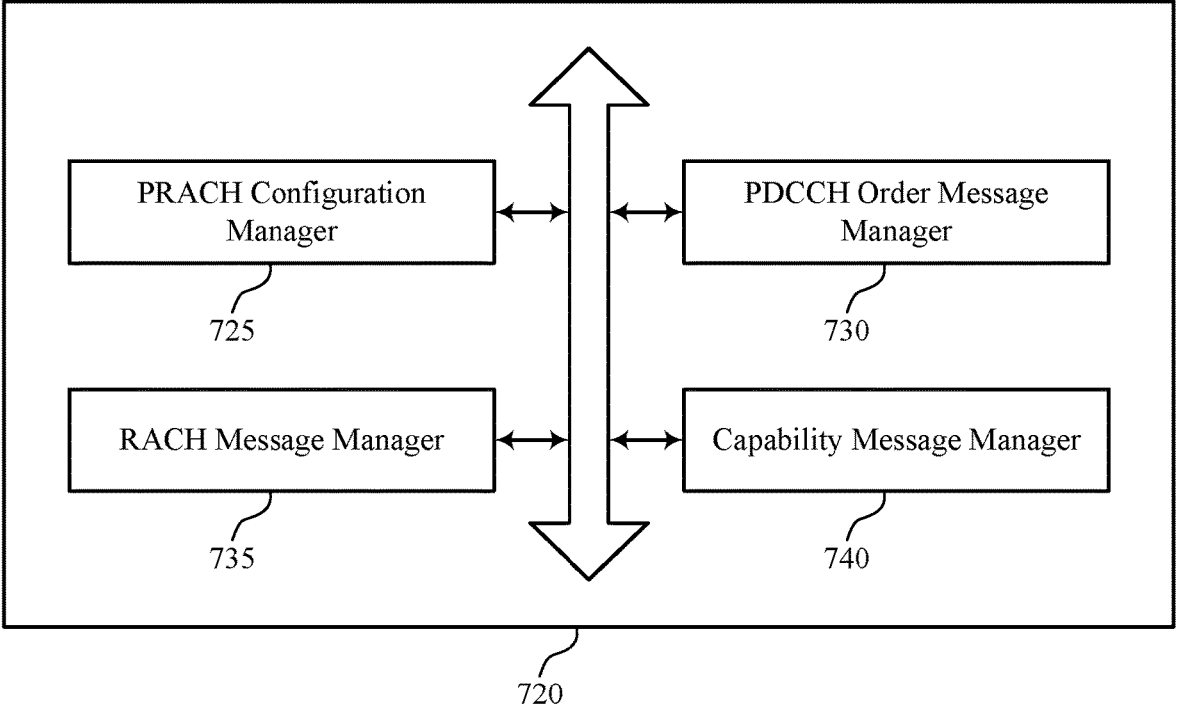
FIG. 7 shows a block diagram of a communications manager that supports selecting RACH occasions for SBFD in accordance with one or more aspects of the present disclosure.

FIG. 7 shows a block diagram 700 of a communications manager 720 that supports selecting RACH occasions for SBFD in accordance with one or more aspects of the present disclosure. The communications manager 720 may be an example of aspects of a communications manager 520, a communications manager 620, or both, as described herein. The communications manager 720, or various components thereof, may be an example of means for performing various aspects of selecting RACH occasions for SBFD as described herein. For example, the communications manager 720 may include a PRACH configuration manager 725, a PDCCH order message manager 730, a RACH message manager 735, a capability message manager 740, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The PRACH configuration manager 725 is capable of, configured to, or operable to support a means for receiving control signaling indicating a SBFD PRACH configuration and a TDD PRACH configuration. The PDCCH order message manager 730 is capable of, configured to, or operable to support a means for receiving a PDCCH order message indicating for the UE to perform a RACH procedure, where the control signaling or the PDCCH order message indicates to perform the RACH procedure according to the SBFD PRACH configuration, the TDD PRACH configuration, or both. The RACH message manager 735 is capable of, configured to, or operable to support a means for transmitting one or more random access messages of the RACH procedure in accordance with the control signaling and the PDCCH order message.

In some examples, to support receiving the PDCCH order message, the PDCCH order message manager 730 is capable of, configured to, or operable to support a means for receiving the PDCCH order message including a bitfield that indicates to perform the RACH procedure according to the SBFD PRACH configuration, the TDD PRACH configuration, or both.

In some examples, to support receiving the control signaling, the PRACH configuration manager 725 is capable of, configured to, or operable to support a means for receiving the control signaling indicating presence of the bitfield in the PDCCH order message.

In some examples, to support receiving the control signaling, the PRACH configuration manager 725 is capable of, configured to, or operable to support a means for receiving the control signaling including a parameter that indicates to perform the RACH procedure according to the SBFD PRACH configuration, the TDD PRACH configuration, or both.

In some examples, the capability message manager 740 is capable of, configured to, or operable to support a means for transmitting a capability message indicating a SBFD PRACH capability of the UE, where the SBFD PRACH configuration indicates a random access preamble, a random access occasion, or both, based on the SBFD PRACH capability, and where transmitting the one or more random access messages includes transmitting the one or more random access messages in accordance with the capability. In some examples, the RACH message manager 735 is capable of, configured to, or operable to support a means for transmitting a first random access message of the one or more random access messages including the random access preamble, via the random access occasion, or both.

In some examples, to support transmitting the one or more random access messages, the RACH message manager 735 is capable of, configured to, or operable to support a means for transmitting the one or more random access messages via an earlier of the first random access occasion or the second random access occasion.

In some examples, the PDCCH order message indicates a first random access occasion in a SBFD symbol period and indicates a second random access occasion in an uplink symbol period. In some examples, the one or more random access messages are transmitted via the first random access occasion, the second random access occasion, or both.

In some examples, the RACH message manager 735 is capable of, configured to, or operable to support a means for transmitting a first random access message of the one or more random access messages via the first random access occasion. In some examples, the RACH message manager 735 is capable of, configured to, or operable to support a means for transmitting a second random access message of the one or more random access messages via the second random access occasion.

Figure 8:
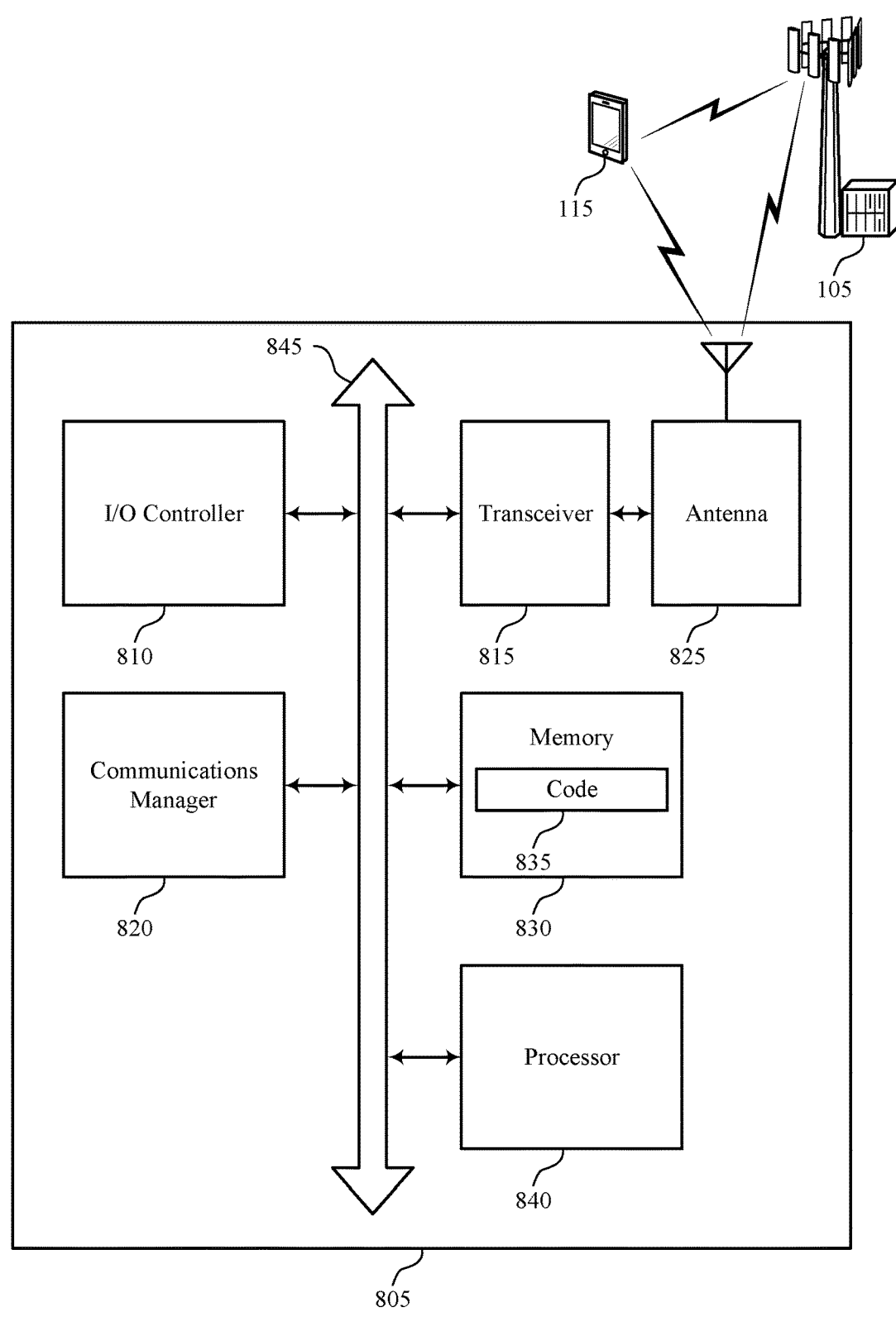
FIG. 8 shows a diagram of a system including a device that supports selecting RACH occasions for SBFD in accordance with one or more aspects of the present disclosure.

FIG. 8 shows a diagram of a system 800 including a device 805 that supports selecting RACH occasions for SBFD in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting selecting RACH occasions for SBFD). For example, the device 805 or a component of the device 805 may include at least one processor 840 and at least one memory 830 coupled with or to the at least one processor 840, the at least one processor 840 and the at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving control signaling indicating a SBFD PRACH configuration and a TDD PRACH configuration. The communications manager 820 is capable of, configured to, or operable to support a means for receiving a PDCCH order message indicating for the UE to perform a RACH procedure, where the control signaling or the PDCCH order message indicates to perform the RACH procedure according to the SBFD PRACH configuration, the TDD PRACH configuration, or both. The communications manager 820 is capable of, configured to, or operable to support a means for transmitting one or more random access messages of the RACH procedure in accordance with the control signaling and the PDCCH order message.

By including or configuring the communications manager 820 in accordance with examples as described herein, the device 805 may support techniques for selecting a PRACH configuration for SBFD-aware UEs, which may enable improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of selecting RACH occasions for SBFD as described herein, or the at least one processor 840 and the at least one memory 830 may be otherwise configured to, individually or collectively, perform or support such operations.

Figure 9:
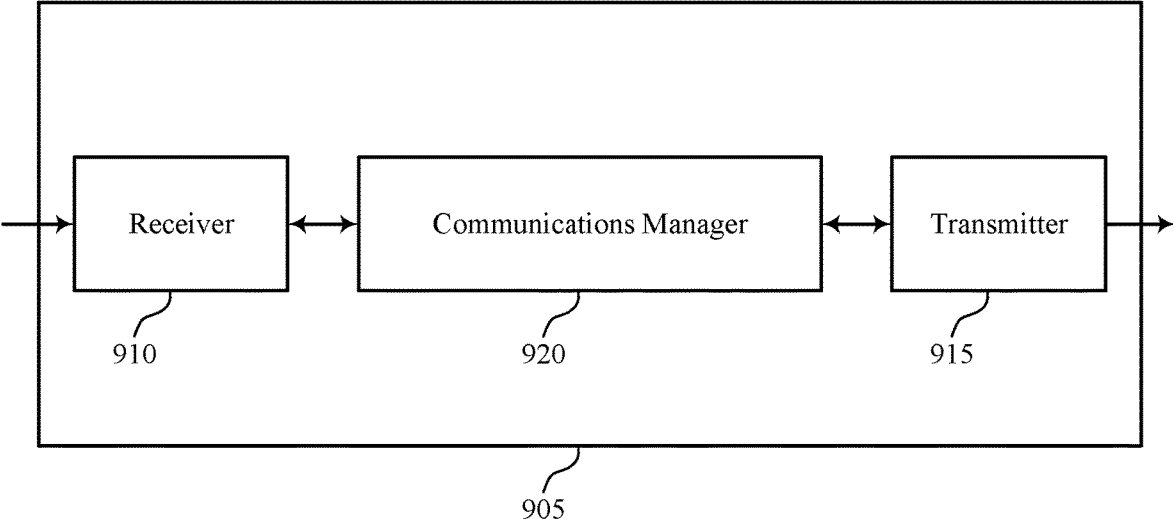
FIGS. 9 and 10 show block diagrams of devices that support selecting RACH occasions for SBFD in accordance with one or more aspects of the present disclosure.

FIG. 9 shows a block diagram 900 of a device 905 that supports selecting RACH occasions for SBFD in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter

915 and the receiver 910 may be co-located in a transceiver, which may include or be coupled with a modem.

The communications manager 920, the receiver 910, the transmitter 915, or various combinations or components thereof may be examples of means for performing various aspects of selecting RACH occasions for SBFD as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for outputting control signaling indicating a SBFD PRACH configuration and a TDD PRACH configuration. The communications manager 920 is capable of, configured to, or operable to support a means for outputting a PDCCH order message indicating for a UE to perform a RACH procedure, where the control signaling or the PDCCH order message indicates to perform the RACH procedure according to the SBFD PRACH configuration, the TDD PRACH configuration, or both. The communications manager 920 is capable of, configured to, or operable to support a means for obtaining one or more random access messages of the RACH procedure in accordance with the control signaling and the PDCCH order message.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for selecting a PRACH configuration for SBFD-aware UEs, which may enable more efficient utilization of communication resources.

Figure 10:
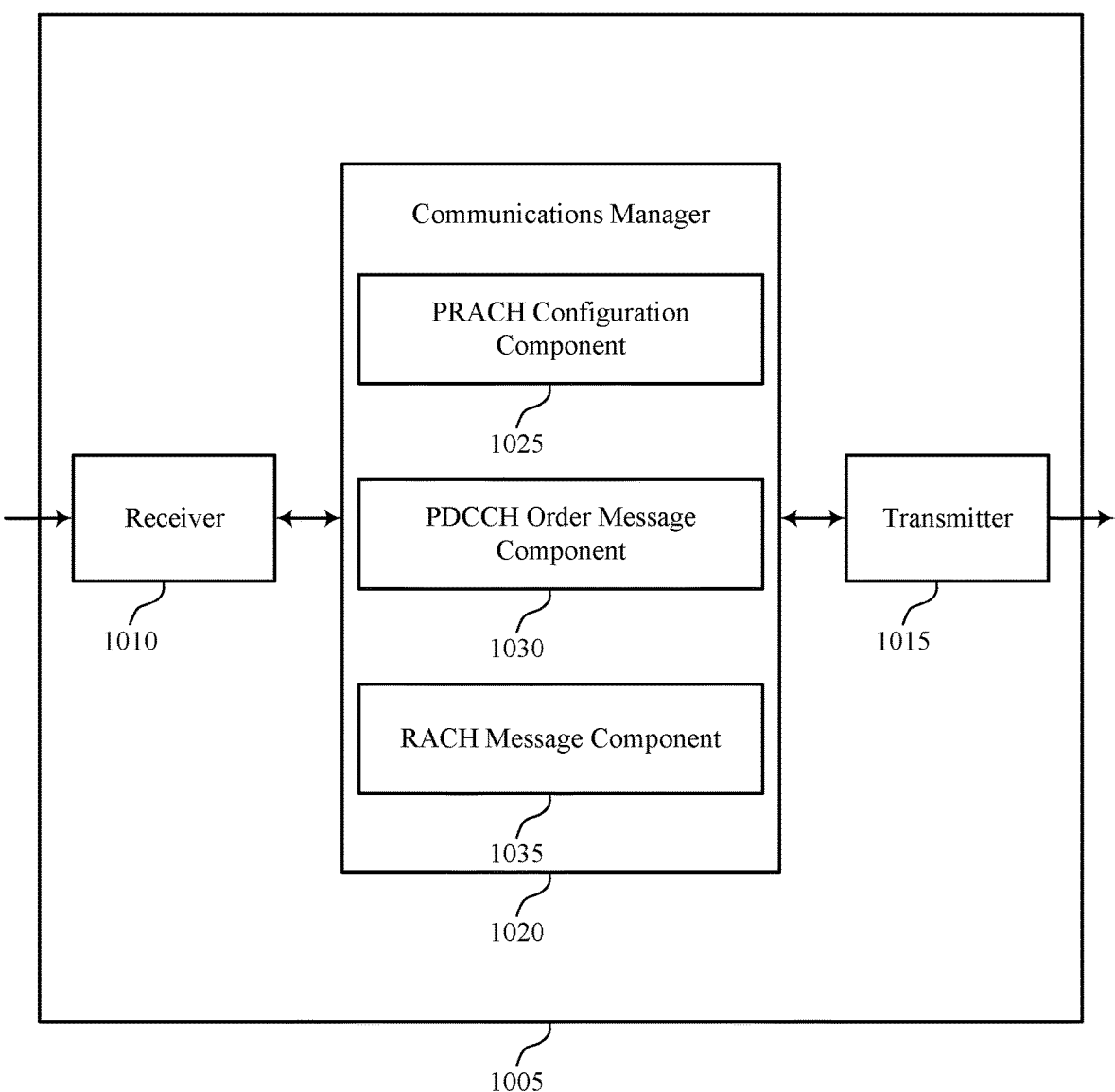

FIG. 10 shows a block diagram 1000 of a device 1005 that supports selecting RACH occasions for SBFD in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of selecting RACH occasions for SBFD as described herein. For example, the communications manager 1020 may include a PRACH configuration component 1025, a PDCCH order message component 1030, a RACH message component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The PRACH configuration component 1025 is capable of, configured to, or operable to support a means for outputting control signaling indicating a SBFD PRACH configuration and a TDD PRACH configuration. The PDCCH order message component 1030 is capable of, configured to, or operable to support a means for outputting a PDCCH order message indicating for a UE to perform a RACH procedure, where the control signaling or the PDCCH order message indicates to perform the RACH procedure according to the SBFD PRACH configuration, the TDD PRACH configuration, or both. The RACH message component 1035 is capable of, configured to, or operable to support a means for obtaining one or more random access messages of the RACH procedure in accordance with the control signaling and the PDCCH order message.

Figure 11:
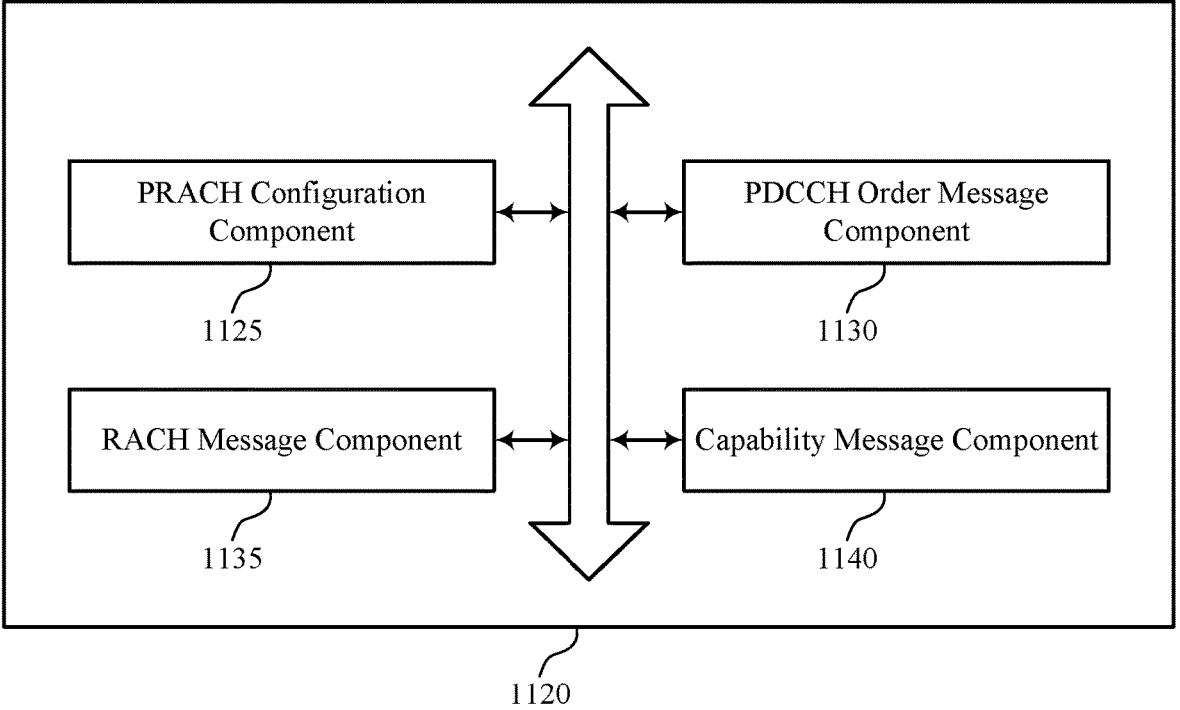
FIG. 11 shows a block diagram of a communications manager that supports selecting RACH occasions for SBFD in accordance with one or more aspects of the present disclosure.

FIG. 11 shows a block diagram 1100 of a communications manager 1120 that supports selecting RACH occasions for SBFD in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of selecting RACH occasions for SBFD as described herein. For example, the communications manager 1120 may include a PRACH configuration component 1125, a PDCCH order message component 1130, a RACH message component 1135, a capability message component 1140, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The PRACH configuration component 1125 is capable of, configured to, or operable to support a means for outputting control signaling indicating a SBFD PRACH configuration and a TDD PRACH configuration. The PDCCH order message component 1130 is capable of, configured to, or operable to support a means for outputting a PDCCH order message indicating for a UE to perform a RACH procedure, where the control signaling or the PDCCH order message indicates to perform the RACH procedure according to the SBFD PRACH configuration, the TDD PRACH configuration, or both. The RACH message component 1135 is capable of, configured to, or operable to support a means for obtaining one or more random access messages of the RACH procedure in accordance with the control signaling and the PDCCH order message.

In some examples, to support outputting the PDCCH order message, the PDCCH order message component 1130 is capable of, configured to, or operable to support a means for outputting the PDCCH order message including a bitfield that indicates to perform the RACH procedure according to the SBFD PRACH configuration, the TDD PRACH configuration, or both.

In some examples, to support outputting the control signaling, the PRACH configuration component 1125 is capable of, configured to, or operable to support a means for outputting the control signaling indicating presence of the bitfield in the PDCCH order message.

In some examples, to support outputting the control signaling, the PRACH configuration component 1125 is capable of, configured to, or operable to support a means for outputting the control signaling including a parameter that indicates to perform the RACH procedure according to the SBFD PRACH configuration, the TDD PRACH configuration, or both.

In some examples, the capability message component 1140 is capable of, configured to, or operable to support a means for obtaining a capability message indicating a SBFD PRACH capability of the UE, where the SBFD PRACH configuration indicates a random access preamble, a random access occasion, or both, based on the SBFD PRACH capability, and where obtaining the one or more random access messages includes obtaining the one or more random access messages in accordance with the capability. In some examples, the RACH message component 1135 is capable of, configured to, or operable to support a means for obtaining a first random access message of the one or more random access messages including the random access preamble, via the random access occasion, or both.

In some examples, to support obtaining the one or more random access messages, the RACH message component 1135 is capable of, configured to, or operable to support a means for obtaining the one or more random access messages via an earlier of the first random access occasion or the second random access occasion.

In some examples, the PDCCH order message indicates a first random access occasion in a SBFD symbol period and indicates a second random access occasion in an uplink symbol period. In some examples, the one or more random access messages are transmitted via the first random access occasion, the second random access occasion, or both.

In some examples, the RACH message component 1135 is capable of, configured to, or operable to support a means for obtaining a first random access message of the one or more random access messages via the first random access occasion. In some examples, the RACH message component 1135 is capable of, configured to, or operable to support a means for obtaining a second random access message of the one or more random access messages via the second random access occasion.

Figure 12:
FIG. 12 shows a diagram of a system including a device that supports selecting RACH occasions for SBFD in accordance with one or more aspects of the present disclosure.

FIG. 12 shows a diagram of a system 1200 including a device 1205 that supports selecting RACH occasions for SBFD in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting selecting RACH occasions for SBFD). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network devices 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for outputting control signaling indicating a SBFD PRACH configuration and a TDD PRACH configuration. The communications manager 1220 is capable of, configured to, or operable to support a means for outputting a PDCCH order message indicating for a UE to perform a RACH procedure, where the control signaling or the PDCCH order message indicates to perform the RACH procedure according to the SBFD PRACH configuration, the TDD PRACH configuration, or both. The communications manager 1220 is capable of, configured to, or operable to support a means for obtaining one or more random access messages of the RACH procedure in accordance with the control signaling and the PDCCH order message.

By including or configuring the communications manager 1220 in accordance with examples as described herein, the device 1205 may support techniques for selecting a PRACH configuration for SBFD-aware UEs, which may enable improved communication reliability, reduced latency, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of selecting RACH occasions for SBFD as described herein, or the at least one processor 1235 and the at least one memory 1225 may be otherwise configured to, individually or collectively, perform or support such operations.

FIG. 13 shows a flowchart illustrating a method 1300 that supports selecting RACH occasions for SBFD in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a SBFD PRACH configuration and a TDD PRACH configuration. The operations of 1305 may be performed in accordance with examples as disclosed herein. In some examples, aspects of the operations of 1305 may be performed by a PRACH configuration manager 725 as described with reference to FIG. 7.

At 1310, the method may include receiving a PDCCH order message indicating for the UE to perform a RACH procedure, where the control signaling or the PDCCH order message indicates to perform the RACH procedure according to the SBFD PRACH configuration, the TDD PRACH configuration, or both. The operations of 1310 may be performed in accordance with examples as disclosed herein. In some examples, aspects of the operations of 1310 may be performed by a PDCCH order message manager 730 as described with reference to FIG. 7.

At 1315, the method may include transmitting one or more random access messages of the RACH procedure in accordance with the control signaling and the PDCCH order message. The operations of 1315 may be performed in accordance with examples as disclosed herein. In some examples, aspects of the operations of 1315 may be performed by a RACH message manager 735 as described with reference to FIG. 7.

FIG. 14 shows a flowchart illustrating a method 1400 that supports selecting RACH occasions for SBFD in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a SBFD PRACH configuration and a TDD PRACH configuration. The operations of 1405 may be performed in accordance with examples as disclosed herein. In some examples, aspects of the operations of 1405 may be performed by a PRACH configuration manager 725 as described with reference to FIG. 7.

At 1410, the method may include receiving a PDCCH order message indicating for the UE to perform a RACH procedure, where the control signaling or the PDCCH order message indicates to perform the RACH procedure according to the SBFD PRACH configuration, the TDD PRACH configuration, or both. The operations of 1410 may be performed in accordance with examples as disclosed herein.

In some examples, aspects of the operations of 1410 may be performed by a PDCCH order message manager 730 as described with reference to FIG. 7.

At 1415, the method may include receiving the PDCCH order message including a bitfield that indicates to perform the RACH procedure according to the SBFD PRACH configuration, the TDD PRACH configuration, or both. The operations of 1415 may be performed in accordance with examples as disclosed herein. In some examples, aspects of the operations of 1415 may be performed by a PDCCH order message manager 730 as described with reference to FIG. 7.

At 1420, the method may include transmitting one or more random access messages of the RACH procedure in accordance with the control signaling and the PDCCH order message. The operations of 1420 may be performed in accordance with examples as disclosed herein. In some examples, aspects of the operations of 1420 may be performed by a RACH message manager 735 as described with reference to FIG. 7.

Figure 15:
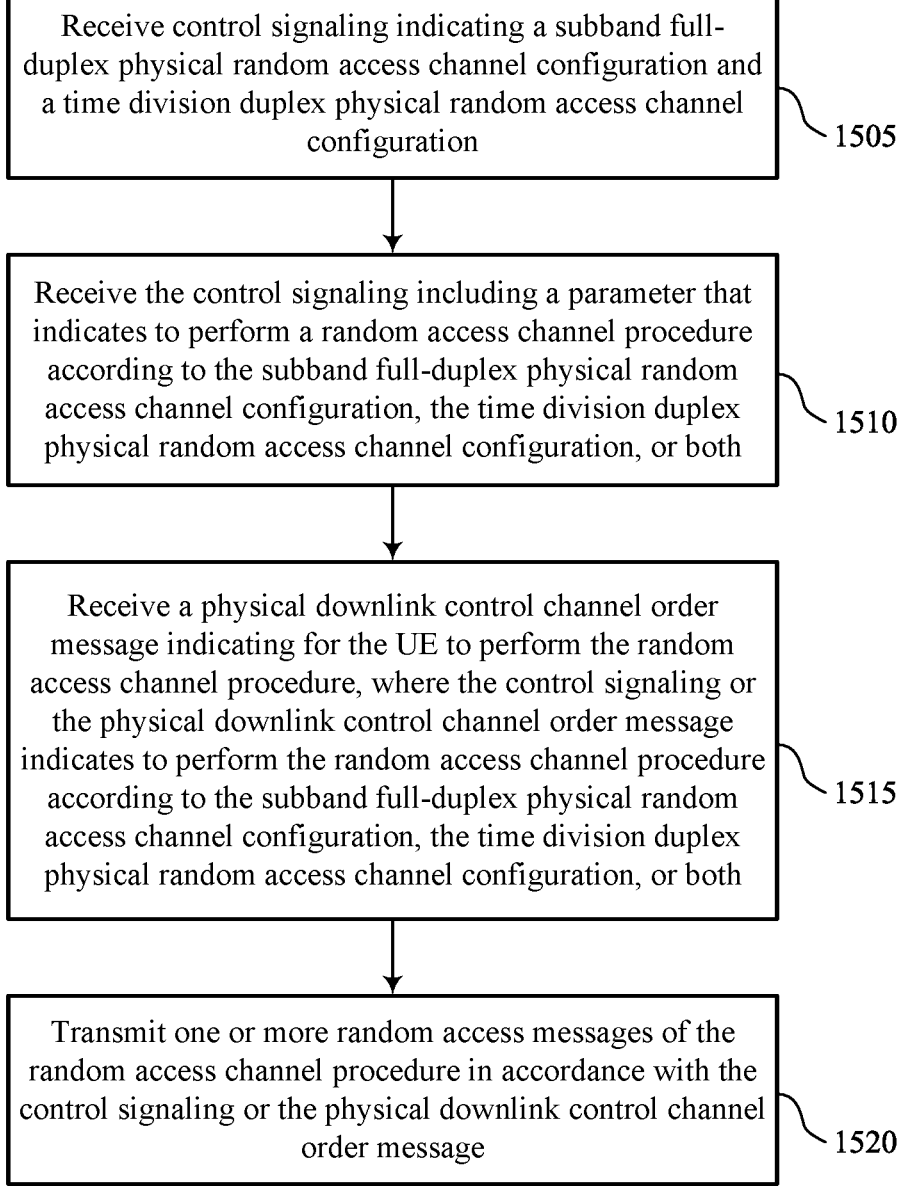

FIG. 15 shows a flowchart illustrating a method 1500 that supports selecting RACH occasions for SBFD in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a SBFD PRACH configuration and a TDD PRACH configuration. The operations of 1505 may be performed in accordance with examples as disclosed herein. In some examples, aspects of the operations of 1505 may be performed by a PRACH configuration manager 725 as described with reference to FIG. 7.

At 1510, the method may include receiving the control signaling including a parameter that indicates to perform a RACH procedure according to the SBFD PRACH configuration, the TDD PRACH configuration, or both. The operations of 1510 may be performed in accordance with examples as disclosed herein. In some examples, aspects of the operations of 1510 may be performed by a PRACH configuration manager 725 as described with reference to FIG. 7.

At 1515, the method may include receiving a PDCCH order message indicating for the UE to perform the RACH procedure, where the control signaling or the PDCCH order message indicates to perform the RACH procedure according to the SBFD PRACH configuration, the TDD PRACH configuration, or both. The operations of 1515 may be performed in accordance with examples as disclosed herein. In some examples, aspects of the operations of 1515 may be performed by a PDCCH order message manager 730 as described with reference to FIG. 7.

At 1520, the method may include transmitting one or more random access messages of the RACH procedure in accordance with the control signaling and the PDCCH order message. The operations of 1520 may be performed in accordance with examples as disclosed herein. In some examples, aspects of the operations of 1520 may be performed by a RACH message manager 735 as described with reference to FIG. 7.

FIG. 16 shows a flowchart illustrating a method 1600 that supports selecting RACH occasions for SBFD in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include outputting control signaling indicating a SBFD PRACH configuration and a TDD PRACH configuration. The operations of 1605 may be performed in accordance with examples as disclosed herein. In some examples, aspects of the operations of 1605 may be performed by a PRACH configuration component 1125 as described with reference to FIG. 11.

At 1610, the method may include outputting a PDCCH order message indicating for a UE to perform a RACH procedure, where the control signaling or the PDCCH order message indicates to perform the RACH procedure according to the SBFD PRACH configuration, the TDD PRACH configuration, or both. The operations of 1610 may be performed in accordance with examples as disclosed herein. In some examples, aspects of the operations of 1610 may be performed by a PDCCH order message component 1130 as described with reference to FIG. 11.

At 1615, the method may include obtaining one or more random access messages of the RACH procedure in accordance with the control signaling and the PDCCH order message. The operations of 1615 may be performed in accordance with examples as disclosed herein. In some examples, aspects of the operations of 1615 may be performed by a RACH message component 1135 as described with reference to FIG. 11.

FIG. 17 shows a flowchart illustrating a method 1700 that supports selecting RACH occasions for SBFD in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include outputting control signaling indicating a SBFD PRACH configuration and a TDD PRACH configuration. The operations of 1705 may be performed in accordance with examples as disclosed herein. In some examples, aspects of the operations of 1705 may be performed by a PRACH configuration component 1125 as described with reference to FIG. 11.

At 1710, the method may include outputting a PDCCH order message indicating for a UE to perform a RACH procedure, where the control signaling or the PDCCH order message indicates to perform the RACH procedure according to the SBFD PRACH configuration, the TDD PRACH configuration, or both. The operations of 1710 may be performed in accordance with examples as disclosed herein. In some examples, aspects of the operations of 1710 may be performed by a PDCCH order message component 1130 as described with reference to FIG. 11.

At 1715, the method may include outputting the PDCCH order message including a bitfield that indicates to perform the RACH procedure according to the SBFD PRACH configuration, the TDD PRACH configuration, or both. The operations of 1715 may be performed in accordance with examples as disclosed herein. In some examples, aspects of the operations of 1715 may be performed by a PDCCH order message component 1130 as described with reference to FIG. 11.

At 1720, the method may include obtaining one or more random access messages of the RACH procedure in accordance with the control signaling and the PDCCH order message. The operations of 1720 may be performed in accordance with examples as disclosed herein. In some examples, aspects of the operations of 1720 may be performed by a RACH message component 1135 as described with reference to FIG. 11.

FIG. 18 shows a flowchart illustrating a method 1800 that supports selecting RACH occasions for SBFD in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include outputting control signaling indicating a SBFD PRACH configuration and a TDD PRACH configuration. The operations of 1805 may be performed in accordance with examples as disclosed herein. In some examples, aspects of the operations of 1805 may be performed by a PRACH configuration component 1125 as described with reference to FIG. 11.

At 1810, the method may include outputting the control signaling including a parameter that indicates to perform a RACH procedure according to the SBFD PRACH configuration, the TDD PRACH configuration, or both. The operations of 1810 may be performed in accordance with examples as disclosed herein. In some examples, aspects of the operations of 1810 may be performed by a PRACH configuration component 1125 as described with reference to FIG. 11.

At 1815, the method may include outputting a PDCCH order message indicating for a UE to perform the RACH procedure, where the control signaling or the PDCCH order message indicates to perform the RACH procedure according to the SBFD PRACH configuration, the TDD PRACH configuration, or both. The operations of 1815 may be performed in accordance with examples as disclosed herein. In some examples, aspects of the operations of 1815 may be performed by a PDCCH order message component 1130 as described with reference to FIG. 11.

At 1820, the method may include obtaining one or more random access messages of the RACH procedure in accordance with the control signaling and the PDCCH order message. The operations of 1820 may be performed in accordance with examples as disclosed herein. In some examples, aspects of the operations of 1820 may be performed by a RACH message component 1135 as described with reference to FIG. 11.

The following provides an overview of aspects of the present disclosure:

Aspect 1: A method for wireless communications by a UE, comprising: receiving control signaling indicating a SBFD PRACH configuration and a TDD PRACH configuration; receiving a PDCCH order message indicating for the UE to perform a RACH procedure, wherein the control signaling or the PDCCH order message indicates to perform the RACH procedure according to the SBFD PRACH configuration, the TDD PRACH configuration, or both; and transmitting one or more random access messages of the RACH procedure in accordance with the control signaling or the PDCCH order message.

Aspect 2: The method of aspect 1, wherein receiving the PDCCH order message comprises: receiving the PDCCH order message comprising a bitfield that indicates to perform the RACH procedure according to the SBFD PRACH configuration, the TDD PRACH configuration, or both.

Aspect 3: The method of aspect 2, wherein receiving the control signaling comprises: receiving the control signaling indicating presence of the bitfield in the PDCCH order message.

Aspect 4: The method of any of aspects 1 through 3, wherein receiving the control signaling comprises: receiving the control signaling comprising a parameter that indicates to perform the RACH procedure according to the SBFD PRACH configuration, the TDD PRACH configuration, or both.

Aspect 5: The method of any of aspects 1 through 4, further comprising: transmitting a capability message indicating a SBFD PRACH capability of the UE, wherein the SBFD PRACH configuration indicates a random access preamble, a random access occasion, or both, based at least in part on the SBFD PRACH capability, and wherein transmitting the one or more random access messages comprises: transmitting a first random access message of the one or more random access messages comprising the random access preamble, via the random access occasion, or both.

Aspect 6: The method of any of aspects 1 through 5, wherein the SBFD PRACH configuration is associated with a first random access occasion and the TDD PRACH configuration is associated with a second random access occasion, wherein transmitting the one or more random access messages comprises: transmitting the one or more random access messages via an earlier of the first random access occasion or the second random access occasion.

Aspect 7: The method of any of aspects 1 through 6, wherein the PDCCH order message indicates a first random access occasion in a SBFD symbol period and indicates a second random access occasion in an uplink symbol period, and the one or more random access messages are transmitted via the first random access occasion, the second random access occasion, or both.

Aspect 8: The method of aspect 7, further comprising: transmitting a first random access message of the one or more random access messages via the first random access occasion; and transmitting a second random access message of the one or more random access messages via the second random access occasion.

Aspect 9: A method for wireless communications by a network entity, comprising: outputting control signaling indicating a SBFD PRACH configuration and a TDD PRACH configuration; outputting a PDCCH order message indicating for a UE to perform a RACH procedure, wherein the control signaling or the PDCCH order message indicates to perform the RACH procedure according to the SBFD PRACH configuration, the TDD PRACH configuration, or both; and obtaining one or more random access messages of the RACH procedure in accordance with the control signaling or the PDCCH order message.

Aspect 10: The method of aspect 9, wherein outputting the PDCCH order message comprises: outputting the PDCCH order message comprising a bitfield that indicates to perform the RACH procedure according to the SBFD PRACH configuration, the TDD PRACH configuration, or both.

Aspect 11: The method of aspect 10, wherein outputting the control signaling comprises: outputting the control signaling indicating presence of the bitfield in the PDCCH order message.

Aspect 12: The method of any of aspects 9 through 11, wherein outputting the control signaling comprises: outputting the control signaling comprising a parameter that indicates to perform the RACH procedure according to the SBFD PRACH configuration, the TDD PRACH configuration, or both.

Aspect 13: The method of any of aspects 9 through 12, further comprising: obtaining a capability message indicating a SBFD PRACH capability of the UE, wherein the SBFD PRACH configuration indicates a random access preamble, a random access occasion, or both, based at least in part on the SBFD PRACH capability, and wherein obtaining the one or more random access messages comprises: obtaining a first random access message of the one or more random access messages comprising the random access preamble, via the random access occasion, or both.

Aspect 14: The method of any of aspects 9 through 13, wherein the SBFD PRACH configuration is associated with a first random access occasion and the TDD PRACH configuration is associated with a second random access occasion, wherein obtaining the one or more random access messages comprises: obtaining the one or more random access messages via an earlier of the first random access occasion or the second random access occasion.

Aspect 15: The method of any of aspects 9 through 14, wherein the PDCCH order message indicates a first random access occasion in a SBFD symbol period and indicates a second random access occasion in an uplink symbol period, and the one or more random access messages are transmitted via the first random access occasion, the second random access occasion, or both.

Aspect 16: The method of aspect 15, further comprising: obtaining a first random access message of the one or more random access messages via the first random access occasion; and obtaining a second random access message of the one or more random access messages via the second random access occasion.

Aspect 17: A UE for wireless communications, comprising one or more memories storing processor-executable code, and one or more processors coupled with the one or more memories and individually or collectively operable to execute the code to cause the UE to perform a method of any of aspects 1 through 8.

Aspect 18: A UE for wireless communications, comprising at least one means for performing a method of any of aspects 1 through 8.

Aspect 19: A non-transitory computer-readable medium storing code for wireless communications, the code comprising instructions executable by one or more processors to perform a method of any of aspects 1 through 8.

Aspect 20: A network entity for wireless communications, comprising one or more memories storing processor-executable code, and one or more processors coupled with the one or more memories and individually or collectively operable to execute the code to cause the network entity to perform a method of any of aspects 9 through 16.

Aspect 21: A network entity for wireless communications, comprising at least one means for performing a method of any of aspects 9 through 16.

Aspect 22: A non-transitory computer-readable medium storing code for wireless communications, the code comprising instructions executable by one or more processors to perform a method of any of aspects 9 through 16.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively execute the code to cause the UE to:
      receive control signaling indicating a subband full-duplex physical random access channel configuration and a time division duplex physical random access channel configuration;
   receive a physical downlink control channel order message indicating for the UE to perform a random access channel procedure, wherein the control signaling or the physical downlink control channel order message indicates to perform the random access channel procedure according to the subband full-duplex physical random access channel configuration, the time division duplex physical random access channel configuration, or both; and
   transmit one or more random access messages of the random access channel procedure in accordance with the control signaling and the physical downlink control channel order message.

2. The UE of claim 1, wherein, to receive the physical downlink control channel order message, the one or more processors are individually or collectively operable to execute the code to cause the UE to:
   receive the physical downlink control channel order message comprising a bitfield that indicates to perform the random access channel procedure according to the subband full-duplex physical random access channel configuration, the time division duplex physical random access channel configuration, or both.

3. The UE of claim 2, wherein, to receive the control signaling, the one or more processors are individually or collectively operable to execute the code to cause the UE to:
   receive the control signaling indicating presence of the bitfield in the physical downlink control channel order message.

4. The UE of claim 1, wherein, to receive the control signaling, the one or more processors are individually or collectively operable to execute the code to cause the UE to:
   receive the control signaling comprising a parameter that indicates to perform the random access channel procedure according to the subband full-duplex physical random access channel configuration, the time division duplex physical random access channel configuration, or both.

5. The UE of claim 1, wherein the one or more processors are individually or collectively further operable to execute the code to cause the UE to:
   transmit a capability message indicating a subband full-duplex physical random access channel capability of the UE, wherein the subband full-duplex physical random access channel configuration indicates a random access preamble, a random access occasion, or both, based at least in part on the subband full-duplex physical random access channel capability, and wherein transmitting the one or more random access messages comprises:
   transmit a first random access message of the one or more random access messages comprising the random access preamble, via the random access occasion, or both.

6. The UE of claim 1, wherein the subband full-duplex physical random access channel configuration is associated with a first random access occasion and the time division duplex physical random access channel configuration is associated with a second random access occasion, wherein, to transmit the one or more random access messages, the one or more processors are individually or collectively operable to execute the code to cause the UE to:
   transmit the one or more random access messages via an earlier of the first random access occasion or the second random access occasion.

7. The UE of claim 1, wherein the physical downlink control channel order message indicates a first random access occasion in a subband full-duplex symbol period and indicates a second random access occasion in an uplink symbol period, and wherein the one or more random access messages are transmitted via the first random access occasion, the second random access occasion, or both.

8. The UE of claim 7, wherein the one or more processors are individually or collectively further operable to execute the code to cause the UE to:

transmit a first random access message of the one or more random access messages via the first random access occasion; and transmit a second random access message of the one or more random access messages via the second random access occasion.

9. A network entity, comprising:

one or more memories storing processor-executable code; and one or more processors coupled with the one or more memories and individually or collectively execute the code to cause the network entity to:

output control signaling indicating a subband full-duplex physical random access channel configuration and a time division duplex physical random access channel configuration;

output a physical downlink control channel order message indicating for a user equipment (UE) to perform a random access channel procedure, wherein the control signaling or the physical downlink control channel order message indicates to perform the random access channel procedure according to the subband full-duplex physical random access channel configuration, the time division duplex physical random access channel configuration, or both; and obtain one or more random access messages of the random access channel procedure in accordance with the control signaling and the physical downlink control channel order message.

10. The network entity of claim 9, wherein, to output the physical downlink control channel order message, the one or more processors are individually or collectively operable to execute the code to cause the network entity to:

output the physical downlink control channel order message comprising a bitfield that indicates to perform the random access channel procedure according to the subband full-duplex physical random access channel configuration, the time division duplex physical random access channel configuration, or both.

11. The network entity of claim 10, wherein, to output the control signaling, the one or more processors are individually or collectively operable to execute the code to cause the network entity to:

output the control signaling indicating presence of the bitfield in the physical downlink control channel order message.

12. The network entity of claim 9, wherein, to output the control signaling, the one or more processors are individually or collectively operable to execute the code to cause the network entity to:

output the control signaling comprising a parameter that indicates to perform the random access channel procedure according to the subband full-duplex physical random access channel configuration, the time division duplex physical random access channel configuration, or both.

13. The network entity of claim 9, wherein the one or more processors are individually or collectively further operable to execute the code to cause the network entity to:

obtain a capability message indicating a subband full-duplex physical random access channel capability of the UE, wherein the subband full-duplex physical random access channel configuration indicates a random access preamble, a random access occasion, or both, based at least in part on the subband full-duplex physical random access channel capability, and wherein obtaining the one or more random access messages comprises:

obtain a first random access message of the one or more random access messages comprising the random access preamble, via the random access occasion, or both.

14. The network entity of claim 9, wherein the subband full-duplex physical random access channel configuration is associated with a first random access occasion and the time division duplex physical random access channel configuration is associated with a second random access occasion, wherein, to obtain the one or more random access messages, the one or more processors are individually or collectively operable to execute the code to cause the network entity to:

obtain the one or more random access messages via an earlier of the first random access occasion or the second random access occasion.

15. The network entity of claim 9, wherein the physical downlink control channel order message indicates a first random access occasion in a subband full-duplex symbol period and indicates a second random access occasion in an uplink symbol period, and wherein the one or more random access messages are transmitted via the first random access occasion, the second random access occasion, or both.

16. The network entity of claim 15, wherein the one or more processors are individually or collectively further operable to execute the code to cause the network entity to:

obtain a first random access message of the one or more random access messages via the first random access occasion; and obtain a second random access message of the one or more random access messages via the second random access occasion.

17. A method for wireless communications by a user equipment (UE), comprising:

receiving control signaling indicating a subband full-duplex physical random access channel configuration and a time division duplex physical random access channel configuration;

receiving a physical downlink control channel order message indicating for the UE to perform a random access channel procedure, wherein the control signaling or the physical downlink control channel order message indicates to perform the random access channel procedure according to the subband full-duplex physical random access channel configuration, the time division duplex physical random access channel configuration, or both; and transmitting one or more random access messages of the random access channel procedure in accordance with the control signaling and the physical downlink control channel order message.

18. The method of claim 17, wherein receiving the physical downlink control channel order message comprises:

receiving the physical downlink control channel order message comprising a bitfield that indicates to perform the random access channel procedure according to the subband full-duplex physical random access channel configuration, the time division duplex physical random access channel configuration, or both.

19. The method of claim 18, wherein receiving the control signaling comprises:

receiving the control signaling indicating presence of the bitfield in the physical downlink control channel order message.

20. The method of claim 17, wherein receiving the control signaling comprises:

receiving the control signaling comprising a parameter that indicates to perform the random access channel procedure according to the subband full-duplex physical random access channel configuration, the time division duplex physical random access channel configuration, or both.

* * * * *